United States Patent [19]

Arima

[11] Patent Number: 5,386,149
[45] Date of Patent: Jan. 31, 1995

[54] DATA SYNAPSE EXPRESSING UNIT CAPABLE OF REFRESHING STORED SYNAPSE LOAD

[75] Inventor: Yutaka Arima, Hyogo, Japan

[73] Assignee: Mitsubishi Denki Kabushiki Kaisha, Tokyo, Japan

[21] Appl. No.: 961,288

[22] Filed: Oct. 15, 1992

[30] Foreign Application Priority Data

Oct. 22, 1991 [JP] Japan .................. 3-273789

[51] Int. Cl.$^6$ ............................... H03K 19/08
[52] U.S. Cl. ............................... 395/24; 365/222
[58] Field of Search ........... 307/201, 494, 246, 296.2; 365/222; 395/21, 24

[56] References Cited

U.S. PATENT DOCUMENTS

| 4,805,152 | 2/1989 | Kogan ................. | 365/222 |
| 4,809,223 | 2/1989 | Brown ................. | 365/222 |
| 4,866,645 | 9/1989 | Lish .................... | 364/602 |
| 4,947,482 | 8/1990 | Brown ................. | 307/201 |
| 5,093,803 | 3/1992 | Howard et al. ........ | 307/201 |
| 5,146,602 | 9/1992 | Holler et al. .......... | 395/23 |
| 5,148,514 | 9/1992 | Arima et al. .......... | 395/24 |

FOREIGN PATENT DOCUMENTS 1-237754  9/1989  Japan .
3-80379   4/1991  Japan .

OTHER PUBLICATIONS

"A 336–Neuron 28k–Synapse Self–Learning Neural Network Chip with Branch–Neuron–Unit Architecture", by Yutaka Arima et al., 1991 IEEE International Solid–State Circuits Conference, pp. 182–183 and 313.
"A BiCMOS Analog Neural Network with Dynamically Updated Weights", by Takayuki Morishita et al., 1990 IEEE International Solid–State Circuits Conference, pp. 142–143.

Primary Examiner—Edward P. Westin
Assistant Examiner—Jon Santamauro
Attorney, Agent, or Firm—Lowe, Price, LeBlanc & Becker

[57] ABSTRACT

A synapse expressing unit includes a capacitor for storing a synapse load value information in a form of electric charges, and a refresh control circuit for remedying the change in the amount of the electric charges stored in the capacitor. The refresh control circuit includes a comparator for comparing a potential at an electrode of the capacitor and a reference potential, and a drive circuit responsive to the comparator for recovering the electric charges of the capacitor through charge pumping operation. The synapse load value information is refreshed, and therefore a neural network circuit device reliably operating for a long time duration is provided.

14 Claims, 16 Drawing Sheets

DATA SYNAPSE EXPRESSING UNIT CAPABLE OF REFRESHING STORED SYNAPSE LOAD

BACKGROUND OF THE INVENTION

1. Field of the Invention

The present invention relates to a semiconductor neural network device which electronically implements a neural network, and more particularly, it relates to a synapse expressing circuit which expresses a synapse for coupling neurons with prescribed connection strength. More specifically, the present invention relates to a synapse expressing circuit which can set a synapse load at an arbitrary value, and a semiconductor neural network device which includes such synapse expressing circuits.

2. Description of the Background Art

Among various computing techniques which are modelled on vital cells (neurons), there is a parallel information processing machine called a Boltzmann machine. The Boltzmann machine, proposed by D. H. Ackley et al. in 1985, is a kind of a mathematical model expressing a neural network, which is characterized in stochastic state transition of neurons. When connection strength (hereinafter referred to as a synapse load) Wij between neurons i and j is symmetrical (Wij=Wji) with no self coupling (Wii=0), stationary distribution p(z) of the system (neural network) is provided by the following Boltzmann distribution, assuming that a parameter T expressing the temperature of the system has a finite value:

$$p(z) = C \cdot \exp(\exp(-U(z)/T)$$

where U(z) represents the potential function of the system, z represents the state in the system taken by the neurons, and C represents a normalization coefficient.

With introduction of the aforementioned probability as to state determination of the neurons, it is expected that the neural network system is not trapped by a local minima of state energy but converged to the global minima. In other words, it is expected that a most likely solution can be found. The Boltzmann machine, which is suitable for solving a complicated cost problem, and non-algorithmic problems such as pattern recognition and associative memory, is in contrast with a Turing machine, which requires algorithms for solving problems.

For an apparatus which can efficiently express such a Boltzmann machine at a high speed, some attempts have already been made to implement a strong parallel processing system which imitates the operation of a neutral network by a semiconductor integrated circuit. Before discussing the structure and operation of such a conventional integrated semiconductor neural network device, the operation principle of the Boltzmann machine is now briefly described.

FIG. 10 illustrates the structure and the operation principle of a general neuron model. Referring to FIG. 10, a neuron unit i includes an input part A which receives output signals Sk, Sj and Sm from other units k, j, and m, a conversion part B which converts signals received from the input part A in accordance with a predetermined rule, and an output part C which outputs a signal received from the conversion part.

The input part A has prescribed synapse loads W (synapse loads are hereafter generically denoted by symbol W) with respect to the neuron units k, i and m.

For example, the output signal Sk from the neuron unit k is converted to Wik·Sk with a synapse load Wik in the input. part A, and transmitted to the conversion part B.

The conversion part B is fired when the total sum of the signals received from the input part A satisfies a certain condition, and transmits a signal to the output part C. When a neuron unit is related to a vital cell, the input part A corresponds to a dendrite and the conversion part B corresponds to the body of a nerve cell, while the output part C corresponds to an axon.

In this neuron model, it is assumed that each neuron unit takes two states of Si=0 (non-firing state) and Si=1 (firing state). Each neuron unit updates its state in response to inputs received therein. The total input of the neuron unit i is defined as follows:

$$Ui = \Sigma Wij \cdot Sj + Wii$$

This total sum $\Sigma$ is obtained for j. Symmetrical synapse coupling of Wij=Wji is assumed here, while $-$Wii corresponds to the threshold value of the neuron unit i.

The states of neuron units are stochastically updated asynchronously with each other. When the neuron unit i updates its state, the new state is 1 in the following probability p(Si=1):

$$p(Si=1) = 1/(1 = \exp(-Ui/T))$$

where T represents a parameter, serving similarly to the temperature in a physical system, which takes a positive value. This parameter is generally called "temperature".

FIG. 11 illustrates the relation between the total sum Ui of the inputs and the probability p(Si=1) as to respective temperature levels T. As understood from FIG. 11, the neuron unit i takes either "0" or "1" with a probability of ½ substantially at random when the temperature T is high. When the temperature T approximates zero, on the other hand, the neuron unit i substantially decision-theoretically follows such a threshold logic that the state is "1" when the total sum of the inputs exceeds a certain threshold value.

The state of the Boltzmann machine at a certain time is expressed by combination of ONs (S=1) and OFFs (S=0) of all units, where S generically represents output signals of the neuron units. For a system which is in a certain state, energy E is defined as follows:

$$E = -\Sigma Wij \cdot Si \cdot Sj$$

The total sum $\Sigma$ is obtained as to all subscripts i and j satisfying a relation of i<j. In the above relation, it is assumed that the threshold value of each neuron unit is zero. Such a state is implemented by providing a unit which is normally in an ON state (S=1) to each neuron unit, and whose connection strength is equal to and inverse in sign to the threshold value of an associated unit.

When the respective neuron units starting at arbitrary initial states continue operations, the Boltzmann machine approaches a stochastic equilibrium state which is determined by the synapse loads W of the respective neuron units. As hereinabove described, the Boltzmann machine takes a state α in the following probability P(α):

$$P(\alpha) = C \cdot \exp(-E\alpha/T)$$

where $E\alpha$ represents energy of the neural network system in the state $\alpha$.

In such a Boltzmann machine, a technique called simulated annealing is employed in order to reach the global energy minima. A relative probability of two global states $\alpha$ and $\beta$ is expressed as follows:

$$P(\alpha)/P(\beta)=\exp(-(E\alpha-E\beta)/T)$$

The minimum energy state takes place in the highest probability at an arbitrary temperature. In general, it takes a long time to reach a thermal equilibrium state, and hence it is regarded preferable to start annealing from a high temperature level to gradually reduce the temperature. In general, this state transition is similar to such a state that each crystal atom in a crystal lattice is transferred to a position providing the minimum energy state at a given temperature.

In the Boltzmann machine, it is necessary to find out such weight i.e., synapse loads W that the network itself can implement probability distribution of input/output data as correct as possible with no external provision of such distribution. As a basic equation of a learning rule employed for adjusting such synapse loads W, the following equation is often used:

$$\Delta Wij = \eta \cdot (p^+ij - P^-ij) \tag{1}$$

where $p^+ij$ represents such an expected value that the states of both neuron units i and j are "1" when the neural network is driven by externally supplied educator information to reach an equilibrium state, and $p^-ij$ represents such an expected value that the states of both neuron units i and j are "1" when no educator information is externally supplied. In the above equation (1), the term of $p^+ij$ indicates that connection between the neuron units i and j is reinforced when both of the same are activated. This corresponds to a reinforced learning mechanism of synapse coupling called Hebb's learning rule.

On the other hand, the term of $p^-ij$ indicates that connection (synapse load Wij) between the neuron units i and j is weakened (reduced) when both of these units are activated with no external output supply. This is called anti-learning in general. A learning algorithm in the Boltzmann machine is now briefly described.

The learning algorithm in the Boltzmann machine includes an operation 1 (plus (+) phase), an operation 2 (minus (−) phase), and an operation 3.

Operation 1 (Plus Phase): States of input units and output units (visible units) are fixed to specific patterns which are shown by input data and output data (educator data) according to pattern appearance probabilities, respectively. The operation 1 includes (a) an annealing process, (b) a data collection process and (c) a process of obtaining $p^+ij$. In the annealing process (a), the states of the respective units are changed for respective temperature levels T along the following equations (2) and (3):

$$\Delta Ei = \Sigma Wij \cdot Sj \tag{2}$$

$$Pi = 1/(1+\exp(-\Delta Ei/T)) \tag{3}$$

In the equation (2), the total sum $\Sigma$ is obtained in relation to the subscript j. This equation (2) provides an energy gap between states Si of "0" and "1" of the unit i with respect to the energy E of the overall neural network. The equation (3) provides such a probability that the unit i enters a new state Si of "1" when this energy gap takes place. In the aforementioned process (a), the temperature T, which is started from a high level, is successively reduced. When the temperature T is reduced to a low level and a prescribed annealing procedure is terminated, the neural network is assumed to be relaxed to a relatively low energy state, to reach a thermal equilibrium state.

The data collection process (b) is adapted to obtain such a number of times that respective states S of units which are coupled to each other are "1" after the annealing process (a) is repeated a prescribed number of times.

The process (c) of obtaining $p^+ij$ is adapted to obtain an average value of data obtained in the process (b) after the annealing process (a) and the data collection process (b) are repeated a prescribed number of times in correspondence to an educator pattern, to assume that the average value is $p^+ij$.

The operation 2 (minus phase) similarly includes an annealing process (a), a data collection process (b) and a process (c) of obtaining $p^-ij$. The processes (a), (b) and (c) in the operation 2 are similar to those in the operation 1 (plus phase). In the operation 2 (minus phase), however, states of only units (input units) associated to input data are fixed according to appearance probabilities of educator data. In the operation 2, the processes (a), (b) and (c) are so repeated that an average value thereafter obtained in the process (c) is assumed to be $p^-ij$, similarly to the operation 1.

In the operation 3, the synapse load Wij is changed with the as-obtained average values $p^+ij$ and $p^-ij$ in accordance with the following relational expression:

$$\Delta Wij = \eta \cdot (p^+ij - p^-ij) \tag{4}$$

where $\eta$ represents a positive constant which determines the degree of a single change of the synapse load Wij. As clearly understood from the above expression (4), the amount of change of the synapse load Wij is determined only by the states of the two units i and j which are coupled to each other. The final object of learning is to converge the amount $\Delta Wij$ of change which is expressed in the expression (4) to a value as small as possible, ideally to zero.

Various apparatuses have been proposed which implement a neural network (called Boltzmann machine) having the aforementioned learning function, by a semiconductor electronic circuit. The inventor et al. have already proposed a semiconductor neural network integrated circuit device having a structure suitable for integration as well as high-speed operability and high learning efficiency (refer to Japanese Patent Laying-Open No. 3-80379).

FIG. 12 shows an exemplary overall structure of a semiconductor neural network integrated circuit device proposed by the inventor et al. The integrated circuit device shown in FIG. 12 is to implement a neural network having five neurons. Referring to FIG. 12, the neural network integrated circuit device includes a column of five neuron units NU1, NU2, NU3, NU4 and NU5, and synapse expressing circuits SY1 to SY10 which are arranged substantially in the form of a right-angled triangle. Respective input parts of the neuron units NU1 to NU5 are connected with dendrite signal lines DE1, DE2, DE3, DE4 and DE5 respectively. The respective neuron units NU1 to NU5 compare signals on the corresponding dendrite signal lines DE1 to DE5 with annealing information contained therein, to generate state signals S1 to S5 of "1" or "0" on the basis of the results of the comparison.

The neural network integrated circuit device further includes axon signal lines AX1, AX2, AX3, AX4 and AX5 which transmit state signals SI1, SI2, SI3, SI4 and SI5 respectively. The state signals SI1 to SI5 may be externally supplied input data, or state signals transmitted from another layer.

Each of the synapse expressing circuits SY1 to SY10 transmits a signal W·S obtained by weighting the state signal SI received from the corresponding axon signal line AX (symbol AX generically denotes the axon signal lines AX1 to AX5) with a synapse load W stored therein, to the corresponding dendrite signal line DE (symbol DE generically denotes the dendrite signal lines DE1 to DE5).

In the Boltzmann machine which is the model of this semiconductor neural network integrated circuit device, the synapse load W is symmetrical such that Wij=Wji. Thus, each synapse expressing circuit SY (symbol SY generically denotes the synapse expressing circuits SY1 to SY5) provides two synapse loads.

The axon signal line AX1 is connected to first axon signal input terminals of the synapse expressing circuits SY1, SY2, SY3 and SY4. The axon signal line AX2 is connected to a second axon signal input terminal of the synapse expressing circuit SY1 and respective first axon signal input terminals of the synapse expressing circuits SY5, SY6 and SY7. The axon signal line AX3 is connected to respective second axon signal input terminals of the synapse expressing circuits SY2 and SY5 and respective first axon signal input terminals of the synapse expressing circuits SY8 and SY9. The axon signal line AX4 is connected to second axon signal input terminals of the synapse expressing circuits SY3, SY6 and SY8 and a first axon signal input terminal of the synapse expressing circuit SY10. The axon signal line AX5 is connected to second axon signal input terminals of the synapse expressing circuits SY4, SY7, SY9 and SY10.

The dendrite signal line DE1 adds up output signals received from first dendrite signal output terminals of the synapse expressing circuits SY1, SY2, SY3 and SY4, and transmits the result to the neuron unit NU1. The dendrite signal line DE2 adds up an output signal received from a second dendrite signal output terminal of the synapse expressing circuit SY1 with those received from first dendrite signal output terminals of the synapse expressing circuits SY5, SY6 and SY7, and transmits the result to the neuron unit NU2. The dendrite signal line DE3 adds up output signals received from second dendrite signal output terminals of the synapse expressing circuits SY2 and SY5 with those received from first dendrite signal output terminals of the synapse expressing circuits SY8 and SY9, and transmits the result to the neuron unit NU3.

The dendrite signal line DE4 adds up output signals received from second dendrite signal output terminals of the synapse expressing circuits SY3, SY6 and SY8 with that received from a first dendrite signal output terminal of the synapse expressing circuit SY10, and transmits the result to the neuron unit NU4. The dendrite signal line DE5 adds up output signals received from second dendrite signal output terminals of the synapse expressing circuits SY4, SY7, SY9 and SY10, and transmits the result to the neuron unit NU5. The neuron units NU1 to NU5 enter firing or non-firing states in response to the signals transmitted through the corresponding dendrite signal lines DE1 to DE5.

FIG. 13 is a block diagram schematically illustrating the structure of each synapse expressing circuit SY shown in FIG. 12. Referring to FIG. 13, the synapse expressing circuit SY comprises a synapse load value storage circuit 101 which stores synapse load value information, a learning control circuit 110 which generates a synapse load correction signal in response to associated two state signals (axon signals) Si and Sj in a learning mode of the neural network, a synapse load correction circuit 103 which corrects the synapse load value information stored in the synapse load value storage circuit 101 in response to the synapse load correction signal, a synapse coupling expressing circuit 105 which weights the state signal Sj received at the second axon signal input terminal with the synapse load value stored in the synapse load storage circuit 101 and transmits the weighted signal Wij·Sj to a dendrite signal line DEj, and another synapse coupling expressing circuit 107 which adds the synapse load value being stored in the synapse load value storage circuit 101 to the state signal Si being transmitted to the first axon signal input terminal to generate a signal Wji·Si and transmits the same onto another dendrite signal line DEi.

The synapse load expressed by the synapse expressing circuit SY is symmetrical such that Wji=Wij. This synapse load value information is stored in the synapse load value storage circuit 101. The synapse load value storage circuit 101 includes a capacitor CA which stores the synapse load value information in the form of charges. The amount of charges stored in the capacitor CA is so continuously changeable that the synapse load value stored in the synapse load value storage circuit 101 is changed in an analog fashion.

The learning control circuit 110 includes a terminal P which receives a control signal Acp indicating execution/non-execution of learning, a terminal C which receives a signal C+/− indicating a learning phase (plus or minus phase), an input terminal S1 which receives the state signal Si, another input terminal S2 which receives the other state signal Sj, a terminal Ip which generates a first correction signal I for increasing the synapse load value stored in the synapse load value storage circuit 101 in response to the states of the state signals Si and Sj in the learning mode, and another terminal Dp which generates a second correction signal D for reducing the synapse load value stored in the synapse load value storage circuit 101 in response to the state signals Si and Sj in the learning mode.

The synapse load correction circuit 103 includes a terminal V which receives the first correction signal I, a terminal L which receives the second correction signal D, and an output terminal M which generates a signal for adjusting the synapse load value stored in the synapse load value storage circuit 101 in response to the correction signals I and D received in the terminals V and L.

The capacitor CA included in the synapse load value storage circuit 101 has an electrode connected to a node N and another electrode coupled to receive a reference potential V. The amount of charges stored in the capacitor CA is increased or decreased in response to the signal received from the synapse load correction circuit 103.

Each of the synapse coupling expressing circuits 105 and 107, which are identical in structure to each other, includes a state signal input terminal Vs for receiving the state signal S (Si or Sj), a terminal Vc for receiving the synapse load value information stored in the synapse load value storage circuit 101, and a terminal Io for outputting a current (loaded current) indicating the product of the state signal S and the synapse load value.

FIG. 14 illustrates an exemplary structure of the learning control circuit 110 shown in FIG. 13. Referring to FIG. 14, the learning control circuit 110 includes an inverter circuit G2 which receives the learning phase indication signal C±, a NAND circuit G3 which receives the state signals Si and Sj supplied to the input terminals S1 and S2, a NOR circuit G4 which receives the learning control signal Acp supplied to the terminal P and outputs from the inverter circuit G2 and the NAND circuit G3, and another NOR circuit G5 which receives the control signal Acp, the learning phase indication signal C± and an output from the NAND circuit G3. The NOR circuit G4 generates the first correction signal I, while the NOR circuit G5 generates the second correction signal D. The operation of this learning control circuit 110 is now described.

In non-learning, the control signal Acp is fixed at a high level. In this case, both outputs of the NOR circuits G4 and G5 are fixed at low levels regardless of the logical states of the state signals Si and Sj received at the terminals S1 and S2, respectively, and no correction signals I and D are generated. Namely, the synapse load value stored in the synapse load value storage circuit 101 is not changed in this case.

In learning, on the other hand, a pulse signal having a constant period and a constant pulse width is supplied to the terminal P. In this case, the correction signals generated from the terminals Dp and Ip are changed in response to the learning phase indication signal C+ received in the learning control circuit C. In the plus phase, the learning phase indication signal C± is set at a high level, so that the output D of the NOR circuit G5 is fixed at a low level. The first correction signal I which is transmitted from the NOR circuit G4 to the terminal Ip is an inverted signal of the pulse signal Acp, since the output of the NAND circuit G3 goes low only when both state signals Si and Sj are at high levels. The synapse load correction circuit 103 increases the synapse load value stored in the synapse load value storage circuit 101 in response to the number of pulses of the first correction signal I ($\Delta W_{ji} > 0$).

In the minus phase, on the other hand, the learning phase indication signal C± is set at a low level, so that the output signal I of the NOR circuit G4 is fixed at a low level. The NOR circuit G5 functions as an inverter circuit since the output of the NAND circuit G3 goes low only when both state signals Si and Sj are at high levels, to generate an inverted signal of the pulse signal Acp as the output signal (second correction signal) D. The synapse load correction circuit 103 reduces the synapse load value stored in the synapse load value storage circuit 101 in response to the second correction signal D ($\Delta W_{ij} < 0$). Namely, the learning control circuit 110 implements the following learning rules:

$$\Delta W^+{ji} = \eta \cdot Si \cdot Sj$$

$$\Delta W^-{ji} = -\eta \cdot Si \cdot Sj$$

where $\eta$ corresponds to the number of pulses supplied to the terminal P.

The signs provided on the amount $\Delta W$ of correction and the coefficient $\eta$ correspond to the learning phases.

The control signal Acp and the learning phase indication signal C± received at the terminals P and C are supplied by an external control circuit (not shown).

FIG. 15 illustrates the structures of the synapse coupling expressing circuit 107, which generates the dendrite signal Wji·Si from the first state signal Si in the synapse expressing circuit SY shown in FIG. 13, as well as the associated circuits. The synapse coupling expressing circuit 105 shown in FIG. 13 is similar in structure to this synapse coupling expressing circuit 107. Referring to FIG. 15, the synapse coupling expressing circuit 107 includes p-channel MOS (insulated gate type field effect) transistors PT1 and PT2 forming a first current path circuit, p-channel MOS transistors PT3 and PT4 forming a second current path circuit, and p-channel and n-channel MOS transistors PT5 and NT1 forming a third current path circuit. The p-channel MOS transistor PT5 is complementarily connected with the n-channel MOS transistor NT1 between a reference voltage (e.g., supply potential) node Vdd and a ground potential node VGND, to form an inverter circuit which inverts the state signal Si received at a terminal Vs.

The p-channel MOS transistor PT1 has a source connected to the reference voltage node Vdd, a gate connected to an output node N2 of the synapse load value storage circuit 101, and a drain connected to a source of the p-channel MOS transistor PT2. The p-channel MOS transistor PT2 has a gate connected to an output node N10 of the inverter circuit formed by the transistors PT5 and NT1, and a drain connected to a synapse coupling current output node Io.

The p-channel MOS transistor PT3 has a source connected to the reference voltage node Vdd, a gate connected to a bias voltage supply node Vb, and a drain connected to a source of the p-channel MOS transistor PT4. The p-channel MOS transistor PT4 has a gate connected to the state signal input node Vs, and a drain connected to the synapse coupling current output node Io.

The p-channel MOS transistor PT5 has a source connected to the reference voltage node Vdd, a gate connected to the state signal input node Vs, and a drain which is connected to a source of the n-channel MOS transistor NT1.

The p-channel MOS transistors in each current path circuit have the same gate widths, i.e., the same conductances. However, the gate widths of the p-channel MOS transistors PT1 and PT2 are set at larger values to be doubled, for example, as compared with those of the p-channel MOS transistors PT3 and PT4. Thus, the current path circuit formed by the transistors PT1 and PT2 can feed a larger current than that formed by the transistors PT3 and PT4.

The synapse load value storage circuit 101 is formed by a capacitor C0. This capacitor CO has an electrode connected to the node N2, and another electrode connected to the reference voltage node Vdd through a node N3. The capacitor CO and the node N2 correspond to the capacitor CA and the node N shown in FIG. 13, respectively.

The synapse load correction circuit 103 includes a capacitor C1 which is provided between the input terminal V for receiving the first correction signal I and a node N5, another capacitor C2 which is provided between the input terminal L for receiving the second correction signal D and a node N6, diodes D2 and D1 which are forward-connected between the node N2 and the reference voltage supply node Vdd (node N3), and diodes D4 and D3 which are forward-connected between the bias voltage supply node Vb (node N1) and the node N2.

The capacitor C1 and the diodes D1 and D2 provide a path for extracting positive charges stored in the node N2 of the capacitor C0 in response to the first correction signal I which is received at the first correction signal input terminal V. The capacitor C2 and the diodes D3 and D4 provide a path for injecting positive charges into the capacitor C0 in response to the second correction signal D received at the second correction signal input terminal L.

In general, the bias voltage Vb and the reference voltage Vdd, which is an operating power source voltage, for example, satisfies the following relation:

$$VGND \leq Vb < Vdd$$

The voltage nodes and the voltages transmitted thereto are denoted by the same symbols. The operation is now described.

When the pulsing correction signal I is supplied to the capacitor C1 through the terminal V, positive charges are extracted from the capacitor C0 by a charge pumping operation of the capacitor C1, to lower the potential the node N2. Every time the pulse of the second correction signal D is supplied to the capacitor C2, on the other hand, positive charges are injected into the capacitor C0 to increase the potential of the node N2. Due to this structure, the single capacitor C0 expresses excitatory coupling and inhibitory coupling. The operation of the synapse coupling expressing circuit 107 is now described.

(i) When the state signal Si is at a low levels the transistors PT4 and PT5 enter ON states and the transistors PT2 and NT1 enter OFF states. The potential of the node N10 goes to the reference voltage level Vdd through the transistor PT5. Thus, a constant current determined by the bias voltage Vb, which is supplied to the gate of the transistor PT3, flows from the output terminal Io.

(ii) When the state signal Si is at a high level, on the other hand, the transistor PT4 enters an OFF state and the transistors PT2 and NT1 enter ON states. A current Ids which is determined by a gate potential of the transistor PT1 with reference to its source potential, i.e., a charge potential Vc of the capacitor C0 (potential of the node N2) flows from the output terminal Io. When an amount Q0 of charges stored in the node N2 of the capacitor C0 is zero, the potential Vc of the node N2 is equal to the reference voltage Vdd. The source potential of the transistor PT1 is at the reference voltage level Vdd. Thus, a current corresponding to a potential $(-Vdd+Vc)=0$ flows from the reference voltage supply node Vdd to the output terminal Io through the transistors PT1 and PT2.

When the node N2 of the capacitor C0 stores a negative amount $-Q0$ of charges, the potential Vc of the node N2 is $(Vdd-Q0 \cdot Ca)$ and the gate potential of the transistor PT1 is $-Q0 \cdot Ca$, whereby the impedance of the p-channel MOS transistor PT1 is reduced and the amount of the flowing current is increased. When the amount of the current exceeds an amount of current which flows through the transistor PT3 when the state signal Si is at a low level, excitatory coupling is expressed. Symbol Ca represents the capacitance of the capacitor C0.

Positive charges are extracted from the capacitor C0 every time the first correction signal I is received, whereby the impedance of the transistor PT1 is reduced and the value of the current Ids flowing to the output terminal Io is increased. On the other hand, positive charges are injected into the capacitor C0 every time the second correction signal D is received, whereby the value of the current Ids supplied from the transistor PT1 to the node N4 is reduced. Thus, it is possible to express both of excitatory coupling and inhibitory coupling by the single capacitor C0, by adjusting the amount of charges stored in the capacitor C0 in response to the correction signals I and D in the learning mode. Further, it is also possible to set the synapse load value expressed by the capacitor C0 at an arbitrary value since this synapse load value is represented by the amount of charges stored in the capacitor C0. Description is now made on an operation of adjusting the amount of charges stored in the capacitor C0 in the learning mode thereby correcting the synapse load value stored in the synapse load value storage circuit 101.

When an electrode of the capacitor C0 connected to the node N2 stores a negative amount $-Q0$ of charges in the synapse load value storage circuit 101 formed by the capacitor C0, the following voltage is developed at the node N2 which is connected to the gate of the p-channel MOS transistor PT1:

$$Vc = (Vdd - Q0 \cdot Ca)$$

where Ca represents the capacitance of the capacitor C0. Therefore, the voltage Vc of the node N2 is equal to Vdd when Q0=0, and reduced as the value Q0 is increased.

In the current path circuit including the p-channel MOS transistor PT1, a gate-to-source voltage (hereinafter simply referred to as "gate voltage") of the p-channel MOS transistor PT1 is $-(Vdd-Vc)$. A constant current defined by this gate voltage $-(Vdd-Vc)$ flows to the node N4 through the transistor PT1. When Q0=0, therefore, no current flows through the transistor PT1 since Ids=0, while the potential of the node N2 is reduced and the current Ids flowing through the transistor PT1 is increased as the amount Q0 of charges is increased. The operation of the synapse load correction circuit 103, which is formed by two charge pumping circuits, is now described with reference to FIGS. 16A and 16B showing the respective charge pumping circuits.

With reference to FIG. 16A, an operation for injecting positive charges into the node N2 of the capacitor C0 is now described. Referring to FIG. 16(A), the pulse signal D is supplied to a circuit which is formed by diodes D13 and D14 and a capacitor C12, causing a charge pumping operation for injecting positive charges into a capacitor C20. The diode D13 has an anode connected to a node N26, and a cathode connected to one electrode of the capacitor C20 through a node N22. The diode D14 has a cathode connected to the node N26, and an anode connected to the bias voltage Vb through a node N21.

The capacitor C12 has an electrode connected to the node N26, and another electrode connected to receive the pulse signal D through a node N28. The operation of the circuit shown in FIG. 16(A) is now described.

Consider that the pulse signal D is supplied to the node N28. When the pulse signal D falls from a high level to a low level, the potential of the node N26 falls in a negative direction due to a capacitive coupling of the capacitor C12, whereby the diode D14 enters an ON state. Thus, a current i1 flows from the node N21 to the node N26. At this time, the diode D13 is in an OFF state.

When the pulse signal D rises from a low level to a high level, the potential of the node N26 is increased by a charge pumping operation through the capacitor C12, whereby the diode D13 enters an ON state and the diode D14 enters an OFF state. Thus, a current i2 flows from the node N26 to the node N22. The values of the currents i1 and i2 are determined by the capacitance of the capacitor C12, an amount Q20 of charges stored in the capacitor C20, forward I-V (current-voltage) characteristics of the diodes D13 and D14, and the pulse width of the pulse signal D. Namely, the current flows into the node N22 every cycle of the pulse signal D to charge the capacitor C20, thereby increasing the amount of charges (positive charges) stored in the capacitor C20. The potential of the node N22 is increased by application of the pulse signal D, which corresponds to the second correction signal D.

With reference to FIG. 16B, a charge pumping operation for extracting positive charges from the capacitor C0 is now described. Referring to FIG. 16B, the charge pumping operation is carried out by diodes D11 and D12 and a capacitor C11. The diode D11 has a cathode connected to the reference voltage node Vdd through a node N13, and an anode connected to a node N15. The diode N12 has a cathode connected to the node N15, and an anode connected to one electrode of a capacitor C10 through a node N12. The capacitor C11 has an electrode connected to the node N15, and another electrode connected to receive the pulse signal (first correction signal) I through a node N17. The other electrode of the capacitor C10 is connected to the reference voltage node Vdd through the node N13. The operation is now described.

The pulse signal I is supplied to the node N17. When the pulse signal I falls from a high level to a low level, the potential of the node N15 falls by capacitive coupling of the capacitor C11, whereby the diode D12 enters an ON state and the diode D11 enters an OFF state so that a current i3 flows from the node N12 to the node N15.

When the pulse signal I rises from a low level to a high level, on the other hand, the potential of the node N15 is increased by a charge pumping operation of the capacitor C11, so that the diode D11 enters an ON state when the potential of the node N15 exceeds the reference voltage Vdd. The diode D12 is in an OFF state, and a current i4 flows from the node N15 to the reference voltage node Vdd (node N13) through the node N13. This current i4 is supplied from the capacitor C10, and a current flows from the node N12 to the reference voltage node Vdd through the node N15 every cycle of the pulse signal I, to reduce the amount of positive charges stored in the capacitor C10. The amounts of the currents i3 and i4 are determined by the capacitances of the capacitors C10 and C11, the amount of charges stored in the capacitor C10, forward I-V characteristics of the diodes D11 and D12, and the pulse width of the pulse signal I. The pulse signal I is used as the first correction signal I, so that the amount of charges stored in the capacitor C10 can be adjusted according to the pulse number thereof.

The synapse load correction circuit shown in FIG. 15 is obtained by connecting the capacitors C20 and C10 of the two charge pumping circuits shown in FIGS. 16A and 16B in common. Namely, the nodes N22 and N12 shown in FIGS. 16A and 16B form a common node, while the capacitors C10 and C20 form a common capacitor.

Relations between the elements shown in FIG. 15 and those shown in FIGS. 16A and 16B are as follows: A common capacitor formed by the capacitor C20 (FIG. 16A) and the capacitor C10 (FIG. 16B) corresponds to the capacitor C0 (FIG. 15), and the diodes D11, D12, D13 and D14 (FIGS. 16A and 16B) correspond to the diodes D1, D2, D3 and D4 shown in FIG. 15, respectively. The capacitors C12 and C11 shown in FIGS. 16A and 16B correspond to the capacitors C2 and C1 shown in FIG. 15, respectively. The nodes N28 and N17 shown in FIGS. 16A and 16B correspond to the nodes L and V shown in FIG. 15, respectively. When a pulse signal is supplied to the node V, the amount of charges (negative charges) stored in the capacitor C0 is increased by the diodes D1 and D2 and the capacitor C1, while the amount of charges (negative charges) stored in the capacitor C0 is reduced when the pulse signal is supplied to the node L.

Due to the aforementioned structure, it is possible to control increase and decrease of the amount of charges (negative charges) stored in the capacitor C0 by the pulse numbers or pulse widths of the pulse signals, i.e., the first and second correction signals I and D, which are supplied to the nodes V and L, respectively. In other words, it is possible to control the voltage Vc of the node N2 which determines the amount of the current flowing out from the output terminal Io by the pulse signals supplied to the synapse load correction circuit 103.

In the aforementioned synapse expressing circuit, it is possible to easily correct the synapse load value with the pulse signals, while this synapse load value, being determined by the amount of charges stored in the capacitor, is analogously changed, so that it is possible to implement an arbitrary synapse load value. Thus, it is possible to obtain a synapse expressing circuit having a learning function with a small number of elements, thereby implementing a highly integrated neural network semiconductor chip having a learning function. In such a synapse expressing circuit, however, the following problem is caused since the synapse load value is expressed by the amount of charges stored in the capacitor.

FIG. 17 illustrates the structure of the capacitor C0 forming the synapse load value storage circuit 101. Referring to FIG. 17, the capacitor C0 for expressing a synapse load value comprises a first conductive layer 203 which is serves as an electrode and is formed on a semiconductor substrate 205 with an underlying insulating film 204, and a second conductive layer 201 which is formed on the first conductive layer 203 with an insulating layer 202 as a dielectrics underlaid. In such a structure, capacitance of the capacitor C0 is at a constant value which is determined by the thickness of the insulating layer 202 and the facing area of the conductive layers 201 and 203. While the first and second conductive layers 203 and 201 may be connected to any nodes, the second conductive layer 201 is connected to the node N3 and the first conductive layer 203 is connected to the node N1 in FIG. 17, for example.

The synapse load value is provided by the amount of charges stored in the node N2. This synapse load value must be maintained at a constant value during an associative or normal operation. Due to the inherent property of the capacitor C0, the stored charges leak to change the synapse load value, and hence it is impossible to carry out a correct associative or normal operation. The path of such a charge leakage is now described.

FIG. 18 illustrates a connection of diodes included in the synapse load correction circuit. Referring to FIG. 18, diodes D801 and D802 correspond to the diodes D1 and D2 or D3 and D4 shown in FIG. 15. The diode D801 is forward-connected between nodes b and a, while the diodes D802 is forward-connected between nodes c and b. Charges are injected or extracted through the node b in response to a pulse signal (correction signal).

As shown in FIG. 19, a series body of the diodes D801 and D802 is expressed by a single p-channel MOS transistor PT800. Referring to FIG. 19, the p-channel MOS transistor PT800 has a substrate region connected to the node a, an electrode and a gate electrode connected together to the node b, and another conduction terminal connected to the node c.

FIG. 20 illustrates the sectional structure of the p-channel MOS transistor PT800 shown in FIG. 19. Referring to FIG. 20, the p-channel MOS transistor PT800 is formed in an N-type well 851 on the surface of a p-type semiconductor substrate 850. The p-channel MOS transistor PT800 includes a high impurity concentration N+ region 852 which is connected to the node a, a high impurity concentration p+ region 853 which is connected to the node b, and a high impurity concentration p+ region 854 which is connected to the node c. A gate electrode 855 is formed on a channel region between the P+ regions 853 and 854 with an insulating film (gate insulating film) 856 thereunder. This gate electrode 855 is connected to the node a through the N+ region 852.

The diode D801 is formed by the P+ region 853 and the N+ region 852. The diode D802 is formed by the P+ region 853, a channel region, i.e., a surface region of the N-type well 851 under the gate electrode 855, and the P+ region 854.

In the structure shown in FIG. 20, still another diode is formed through the node a, the N+ region 852, the N-type well 851 and the P+ region 854. This diode, which is formed between the nodes a and c, exerts no significant influence on any charge pumping operation. In the element structure shown in FIG. 20, the diode D801 is expressed by a P-N junction diode, whereby it is possible to reduce a reversely flowing discharge current, i.e., a leakage current flowing from the node a to the node c, as well as to reduce parasitic capacitance associated with the node b.

When the element structure shown in FIG. 20 is used to form a series body of diodes, depletion layers 861 and 862 are caused in P-N junction portions. Charges are recombined in or diffused through such depletion layers 861 and 862. In the structure shown in FIG. 20, for example, the node c is connected to the electrode providing the synapse load value of the capacitor C0 of the synapse load value storage circuit 101, i.e., the node N2, or the node N1 providing the bias voltage Vb. The node a is connected to the reference voltage node Vdd or the node N2 in the structure shown in FIG. 15. Thus, the amount of charges stored in the capacitor C0 (see FIG. 15) is changed by recombination or diffusion of charges in the depletion layers 861 and 862, and hence the synapse load value cannot be maintained constant.

Still another leakage path Ip of charges is formed through a depletion layer or an inversion layer which is formed under an element isolating film 870 for electrically isolating adjacent elements from each other.

When the node a or c is connected to the constant voltage Vdd or Vb, this voltage may be changed in an operation to generate hole-electron pairs in the N-type well region 851 by impact ionization or the like. The generated charges may change the amount of charges stored in the capacitor C0. When the amount of charges stored in the capacitor C0 is changed by such a phenomenon, the synapse load value obtained by a learning cannot be maintained constant during the associative or normal operations.

FIG. 21 shows a MOS capacitive element, which may be employed as the capacitor C0. In this case, an electrode of the capacitive element is provided by a high impurity concentration N+ region 891 which is formed on the surface of a semiconductor substrate 890, and another electrode 893 is formed on this electrode 891 with an insulating film 892 thereunder. Since the electrode 891 is formed by the diffusion region of high impurity concentration, charges inevitably leak from this diffusion region to the semiconductor substrate 890, to change the synapse load value with a lapse of time.

In other words, it is impossible to implement a neural network which can stably hold respective synapse load values being set by learning or the like for a long time to provide reliable operations.

SUMMARY OF THE INVENTION

An object of the present invention is to provide a synapse expressing circuit which can stably hold a synapse load value for a long time.

Another object of the present invention is to provide a reliable semiconductor neural network device expressing a neural network which stably operates for a long time.

A synapse expressing circuit according to the present invention includes synapse load value storage circuitry including capacitive element for storing synapse load value information in the form of charges, and refresh circuitry for recovering the amount of charges stored in the capacitive element.

The refresh means of the synapse expressing circuit according to the present invention remedies or recovers the amount of charges stored in the capacitive element in response to a refresh instruction, to compensate for change of the synapse load value caused by leakage of the charges from the capacitive element. Thus, the synapse load value storage means stably holds the synapse load value for a long time.

In the semiconductor neural network device according to the present invention, synapse load values stored in an analog form are refreshed (remedied) by the refresh circuitry in the respective ones of the plurality of synapse expressing circuits, whereby it is possible to obtain a device expressing a neural network which stably holds the synapse load values for a long time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
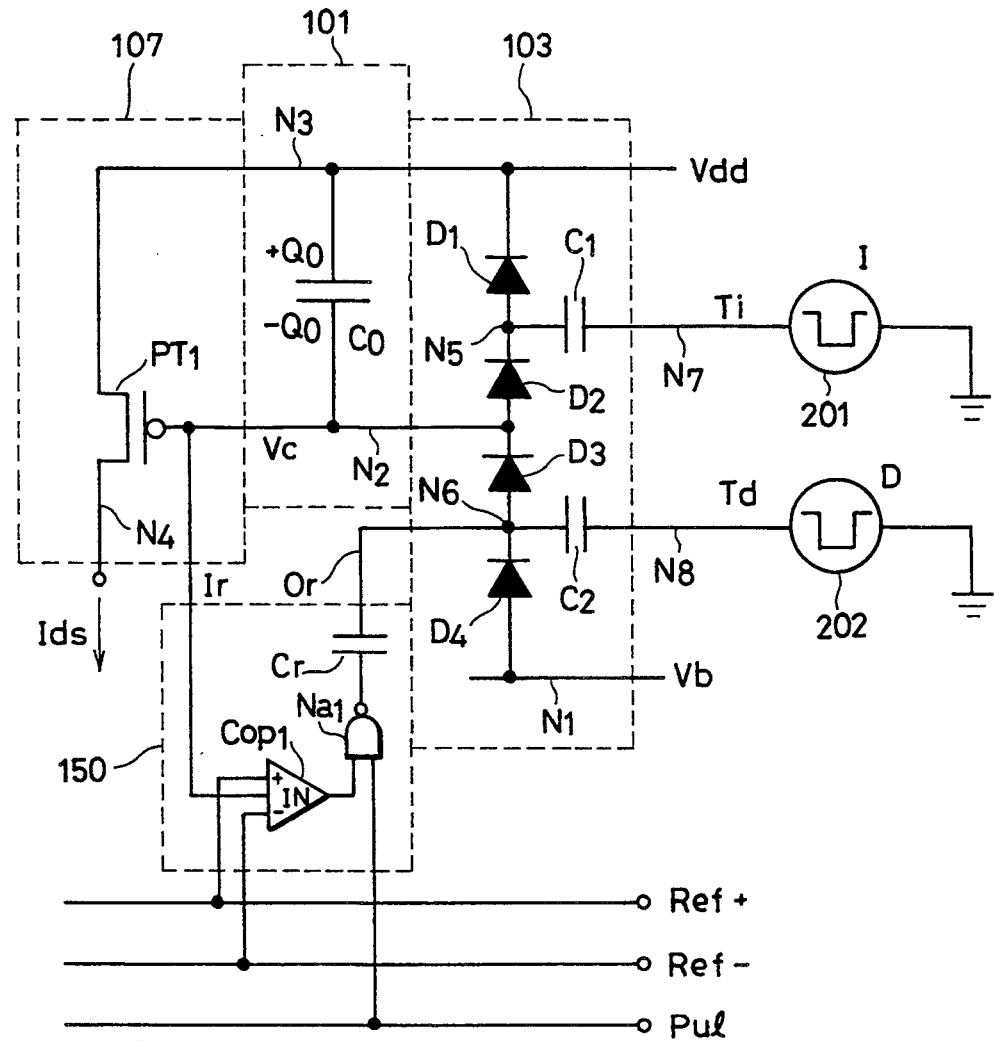
FIG. 1 illustrates the structure of a synapse expressing circuit according to an embodiment of the present invention.
Figure 15:
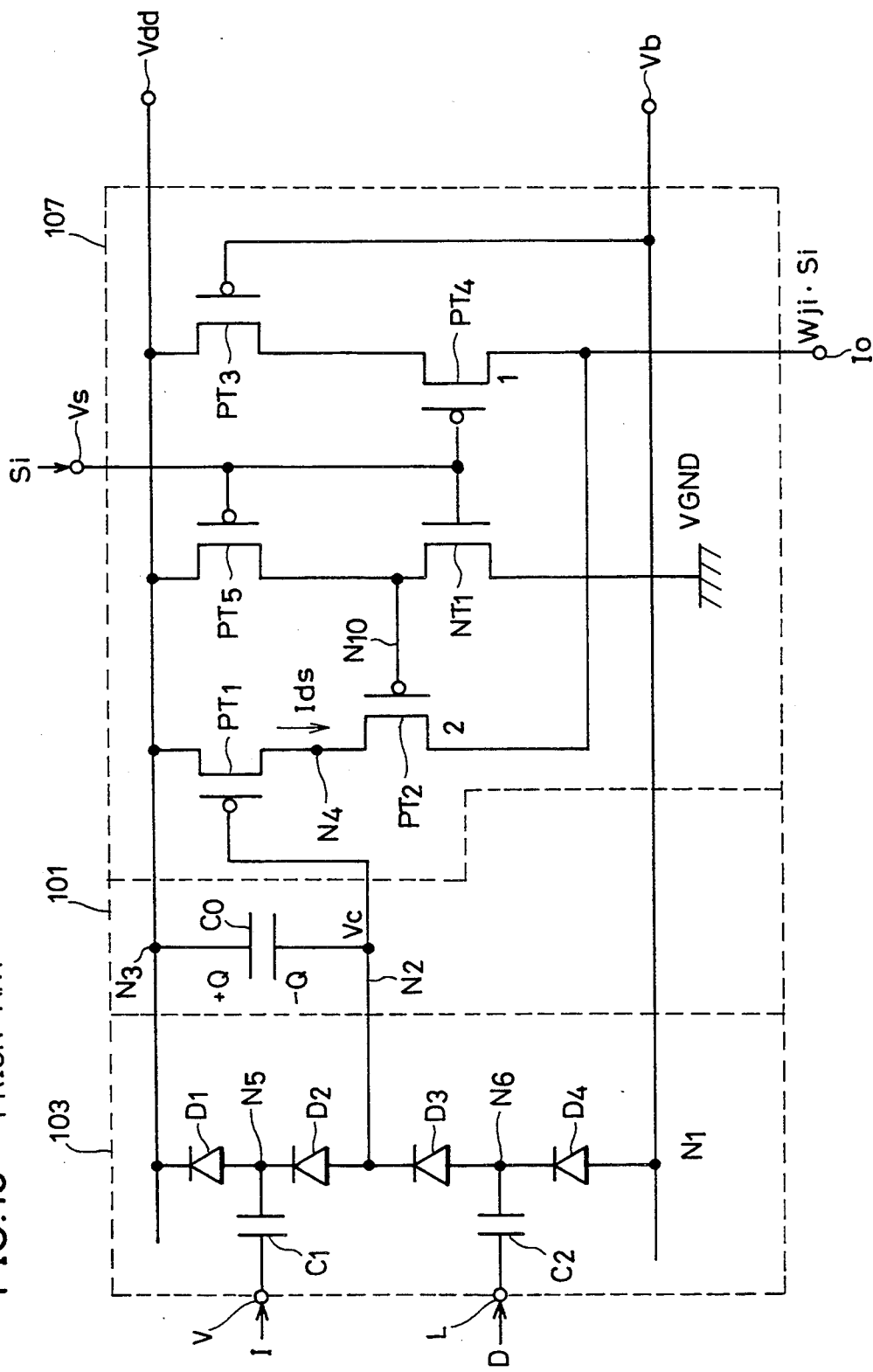
FIG. 15 illustrates exemplary structures of a synapse coupling expressing circuit, a synapse load correction circuit and a synapse load value storage circuit shown in FIG. 13.
Figure 16A:
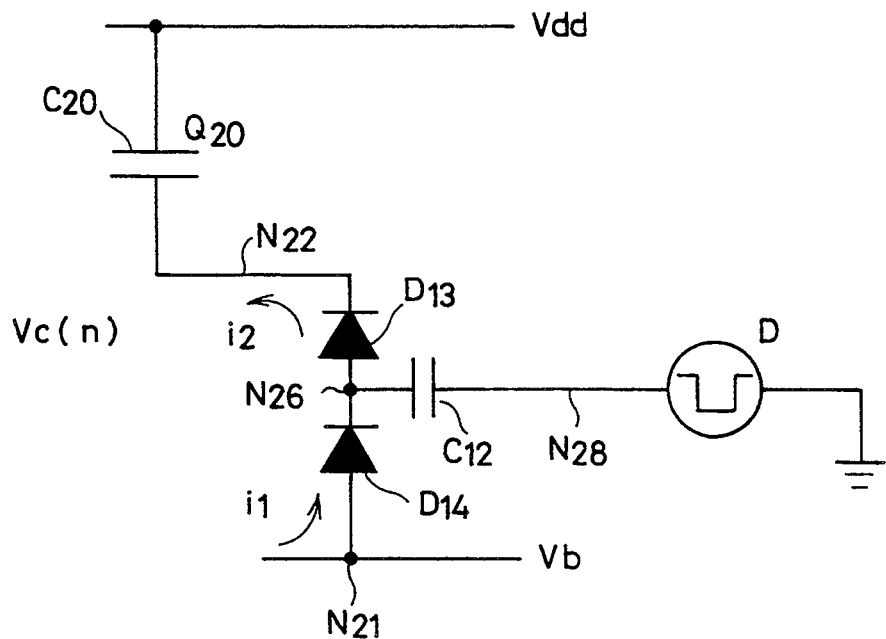
FIG. 16A–16B are a diagram for illustrating the operation of the synapse load correction circuit shown in FIG. 15.
Figure 16B:
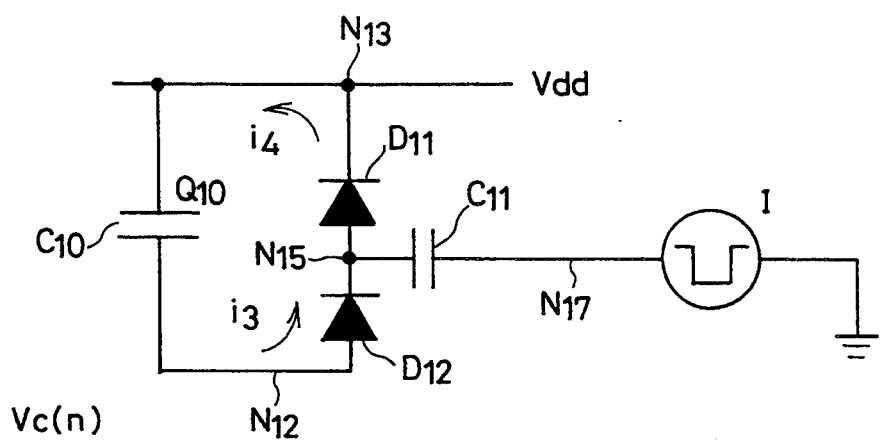
Figure 17:
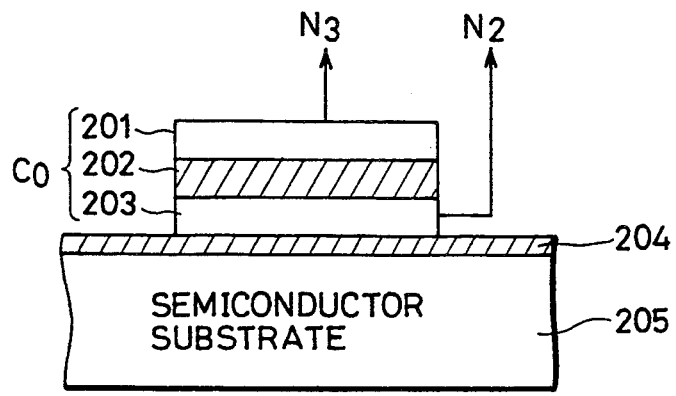
FIG. 17 is a sectional view illustrating an exemplary structure of capacitive element forming the synapse load storage circuit shown in FIG. 15.
Figure 18:
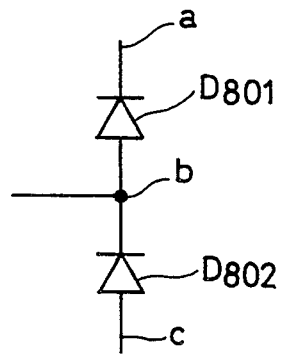
FIG. 18 generically illustrates connection of diodes in the synapse load correction circuit shown in FIG. 15.
Figure 19:
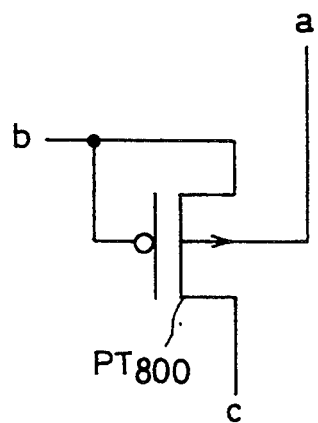
FIG. 19 illustrates a connection of a single MOS transistor for forming a series body of the diodes shown in FIG. 18.
Figure 20:
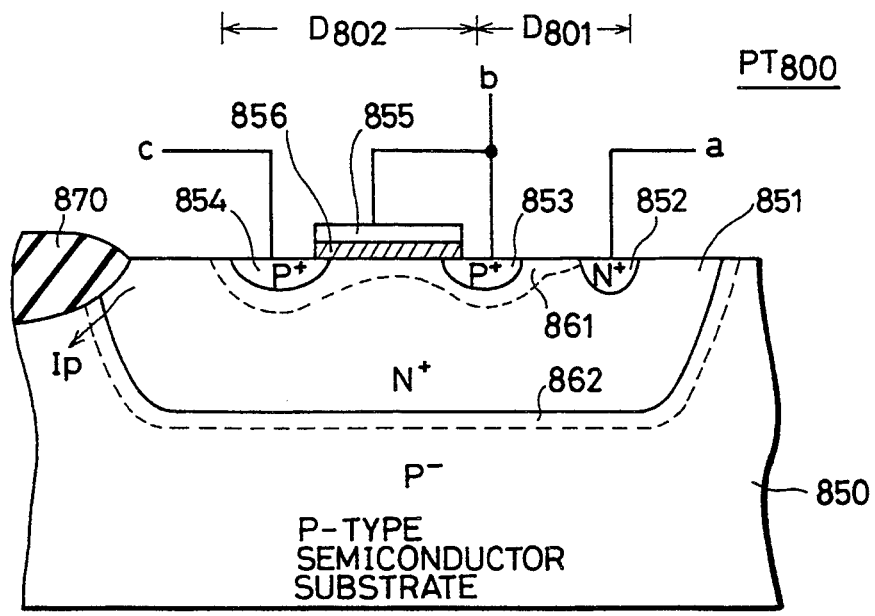
FIG. 20 is a diagram for illustrating the sectional structure of the transistor shown in FIG. 19 and a problem of the prior art.

FIG. 1 illustrates the structure of a synapse expressing circuit according to an embodiment of the present invention. Referring to FIG. 1, a synapse coupling expressing circuit 107, which is shown including only a p-channel MOS transistor PT1 being related to computing of synapse coupling, is similar in structure to that shown in FIG. 15, and naturally includes a circuit part for receiving a state signal Si. A synapse load value storage circuit 101 and a synapse load correction circuit 103 are also similar in structure to those shown in FIG. 15, and corresponding parts are denoted by the same reference numerals, to omit detailed description thereof.

The synapse load correction circuit 103 is supplied with synapse load value correction signals Ti and Td from pulse generation circuits 201 and 202 in a learning mode of operation. The pulse generation circuits 201 and 202, which correspond to the learning control circuit shown in FIG. 15, may be provided in an exterior of the neural network device.

The synapse expressing circuit further includes a refresh circuit 150 for recovering the amount of charges stored in a capacitor C0 of the synapse load value storage circuit 101. The refresh circuit 150 includes a comparator Cop1 which compares a potential Vc of a node N2 providing a synapse load value with reference potentials Ref+ and Ref−, a NAND gate Na1 which receives an output from the comparator Cop1 and a pulse signal Pu1, and a capacitor Cr which receives an output of the NAND gate Na1 at one electrode thereof. The other electrode of the capacitor Cr is connected with an output line Or.

Figure 21:
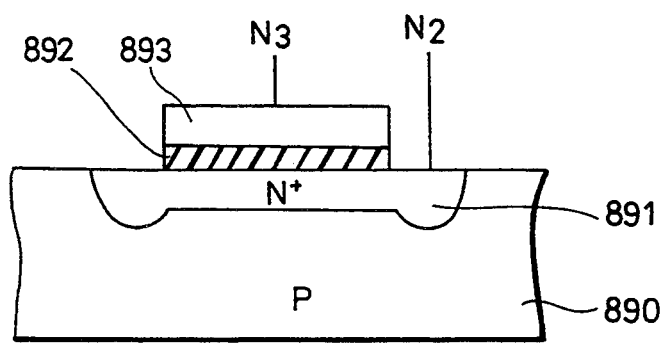
FIG. 21 is a sectional view illustrating another exemplary structure of a capacitor forming the synapse load value storage circuit shown in FIG. 15.

A node to be connected with the output line Or is determined depending on a direction of change of the amount of charges stored in the capacitor C0. Such a direction can be determined by the element structure or analysis of the operation. For example, if the structure of FIG. 21 is used, positive charges tend to be extracted from the node N2. When the potential Vc of the node N2 is changed toward a bias voltage Vb or a ground potential VGND with a lapse of time, positive charges tend to be extracted from the capacitor C0 through the node N2. For this case, the output line Or of the refresh circuit 150 is connected to a node n6 for injecting positive charges into the capacitor C0.

When the amount of charges stored in the capacitor C0 is changed toward a reference voltage Vdd, positive charges tend to be injected into the capacitor C0 and the potential Vc of the node N2 is increased. For this case, the output line Or of the refresh circuit 150 is connected to a node N5 for extracting the positive charges. Although the output line Or of the refresh circuit 150 is connected either to the node N5 or to the node N6, the refresh operation itself remains unchanged. In the structure shown in FIG. 1, the potential Vc of the node N2 of the capacitor C0 is changed toward the bias voltage Vb or the ground potential VGND, and hence the output line 0r of the refresh circuit 150 is connected to the node N6.

The comparator Cop1 of the refresh circuit 150 receives the potential Vc of the node N2 at its input terminal IN through an input line Ir, while receiving the reference voltage Ref+ and Ref− at reference voltage input terminals + and −, respectively. When the voltage Vc received through the input line Ir is between the reference voltage Ref+ and Ref−, the comparator Cop1 outputs a high-level signal which indicates that a refresh operation is required.

The NAND gate Na1 operates as an inverter circuit when the comparator Cop1 outputs a high-level signal, to invert and pass the pulse signal Pu1, which in turn serves as a refresh instruction signal. The capacitor Cr performs a charge pumping operation in response to the pulse signal outputted from the NAND gate Na1, to increase or decrease the potential of the node N6.

The refresh reference voltage signals Ref+ and Ref− and the pulse signal Pu1 are supplied to a plurality of synapse expressing circuits in common, so that refresh operations are simultaneously performed in the plurality of synapse expressing circuits.

Figure 2:
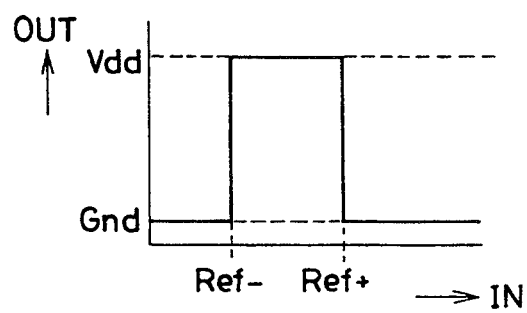
FIG. 2 illustrates input/output response characteristics of a comparator included in a refresh control circuit shown in FIG. 1.

FIG. 2 illustrates input/output response characteristics of the comparator Cop1 included in the refresh circuit 150. The axis of abscissa shows an input IN supplied through the input line Ir, and the axis of ordinate shows an output OUT. As understood from the input/output response characteristics shown in FIG. 2, the comparator Cop1 outputs a high-level signal of the reference voltage Vdd level when the voltage Vc expressing a synapse load value, which is supplied through the input line Ir, is between the reference voltage (also serving as refresh control signals) Ref+ and Ref−, while otherwisely outputting a low-level signal of the ground potential VGND level.

Figure 3:
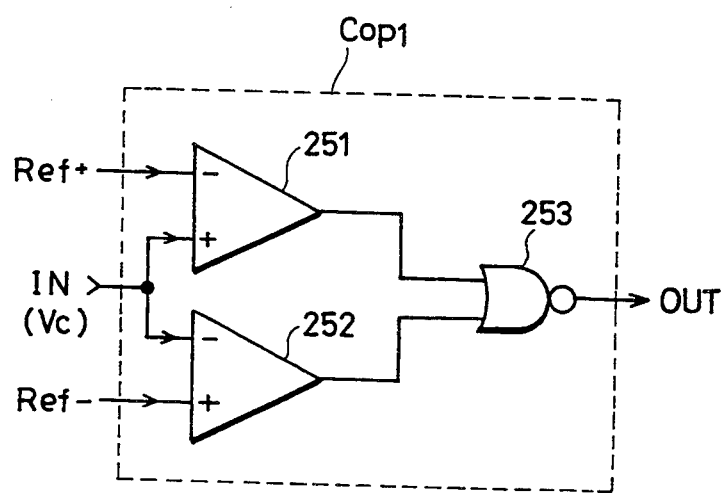
FIG. 3 illustrates an exemplary structure of the comparator included in the refresh control circuit shown in FIG. 1.

FIG. 3 illustrates an exemplary structure of the comparator Cop1. Referring to FIG. 3, the comparator Cop1 includes a first comparing circuit 251 which receives the voltage Vc, expressing a synapse load and supplied to the input IN, at its positive input, while receiving the reference voltage Ref+, serving as a refresh control signal, at its negative input, a second comparing circuit 252 which receives the reference voltage Ref−, serving as a refresh control signal, at its positive input, while receiving the voltage Vc supplied to the input IN at its negative input, and a NOR gate 253 which receives outputs from the comparing circuits 251 and 253. Each of the comparing circuits 251 and 252 outputs a high-level signal when the voltage received at its positive input is higher than that received in its negative input.

In other words, the first comparing circuit 251 outputs a high-level signal when the voltage Vc is higher than the reference voltage Ref+. The second comparing circuit 252 outputs a high-level signal when the voltage Vc is lower than the reference voltage Ref−. The NOR gate 253 outputs a high-level signal only when both inputs are at low levels. Both outputs from the comparing circuits 251 and 252 go low only when the voltage Vc is between the reference voltages Ref+ and Ref−. Thus, it is possible to obtain a comparator having the input/output characteristics shown in FIG. 2 by the structure shown in FIG. 3.

FIG. 3 merely shows an exemplary structure, and the comparator Cop1 may have another structure so far as the input/output characteristics shown in FIG. 2 is implemented.

In a refresh operation, the reference voltages Ref+ and Ref− are successively changed in a discrete manner. The pulse signal Pu1 is generated only in the refresh node of operation. The refresh operation of the refresh circuit 150 is now described with reference to FIG. 4 showing an operation waveform diagram thereof.

Figure 4:
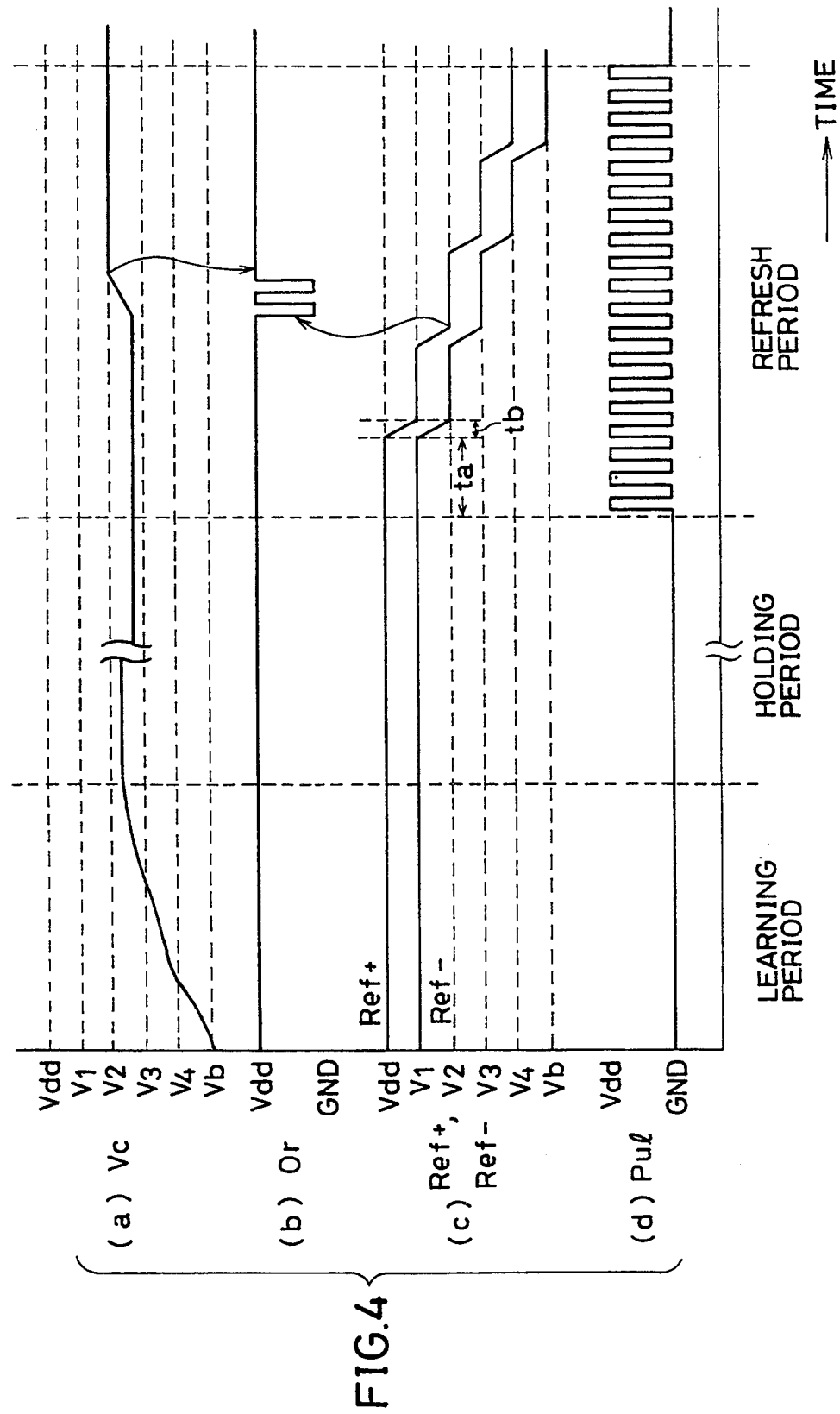
FIG. 4 is a signal waveform diagram showing a refresh operation of the synapse expressing circuit shown in FIG. 1.

FIG. 4 shows a refresh operation for refreshing the synapse load value, i.e., the voltage Vc, to six discrete values Vdd, V1, V2, V3, V4 and Vb. The number of the discrete values is not restricted to six but may arbitrarily be selected. The minimum value of the intervals between any two adjacent discrete values, i.e., (Vdd−V1), (V1−V2), ... , (V4−Vb) is preferably so set that change of the synapse load value caused by leakage of charges during a period between completion of a refresh operation and start of a next refresh operation will not exceed this minimum value.

In a learning period, the synapse load value stored in the synapse load value storage circuit 101, i.e., the amount of charges stored in the capacitor C0, is converged to an appropriate value. This value is corrected by the pulse signals Ti and Td received from the pulse generation circuits 201 and 202. Alternatively, the synapse load value, i.e., the potential Vc of the node N2, may be directly set externally by the pulse signals Ti and Td without such learning. After the synapse load value is set, the voltage Vc of the node N2 expresses the set synapse load value. Referring to FIG. 4, the voltage Vc is set between the voltages V2 and V3.

When the learning period is terminated, the circuit enters a standby state or performs an associative or normal operation, to enter a charge holding period for holding the charges in the capacitor C0 of the synapse load value storage circuit 101. During this holding period, the voltage Vc of the node N2 is gradually reduced by leakage of the charges. It is assumed here that the voltage Vc of the node N2 is changed toward the bias voltage Vb or the ground potential VGND, as hereinabove described. In general, it is necessary to perform a refresh operation for remedying the reduction of the charges stored in the capacitor C0 before the voltage Vc decreases below the voltage V3.

In order to carry out a refresh operation, the pulse signal Pu1 and the reference voltage Ref+ and Ref− are supplied as refresh control signals in a refresh period. The reference voltages Ref+ and Ref− are set at the reference voltage Vdd and V1, respectively, during the learning and holding periods.

The pulse signal Pu1 is generated when a refresh period is started. In the refresh period, the reference voltages Ref+ and Ref− are set at the voltages Vdd and V1, respectively, during an initial period ta. Since the voltage Vc is less than the reference voltages Ref+ and Ref−, the comparator Cop1 outputs a low level signal, and the output of the NAND gate Na1 is at a high level, so that no charge pumping operation is executed. After termination of the period ta, the reference voltages Ref+ and Ref− are changed to the next discrete values V1 and V2 after a lapse of another period tb. In other words, the reference voltages Ref+ and Ref− are held at first discrete values for the period ta and then changed to next discrete values in the period tb with the interval between the discrete values maintained. This operation is repeated until the reference voltage Ref− reaches the bias voltage Vb.

When the reference voltages Ref+ and Ref− reach the voltages V2 and V3, respectively, in a refresh operation, the comparator Cop1 outputs a high-level signal since the voltage Vc is between the voltages V2 and V3. The NAND gate Na1 responsively operates as an inverter circuit, to invert and output the pulse signal Pu1. In response to the pulse signal Pu1 received from the NAND gate Na1, the capacitor Cr executes a charge pumping operation, to increase and decrease the potential of the node N6. When the potential of the node N6 is increased, a current flows into the node N2 through a diode D3, so that positive charges are injected into (negative charges are extracted from) the capacitor C0 and the voltage Vc of the node N2 is increased. This charge pumping operation, i.e., a refresh operation, is carried out until the voltage Vc of the node N2 reaches the voltage V2. When the voltage Vc of the node N2 reaches the voltage V2, the output of the comparator Cop1 goes low, to carry out no more refresh operation for compensating for the charges stored in the capacitor C0.

Due to the aforementioned structure, it is possible to obtain a structure which can reliably recover the amount of charges even if leakage of charges takes place in the capacitor C0 of the synapse load value storage circuit 101, thereby stably driving the neural network for a long time.

During a refreshing period ta, the synapse load correction circuit 103 can sufficiently increase the synapse load value by the voltage of the interval of adjacent discrete values by the pulse signal Pu1. As to the period ta, therefore, the minimum value thereof is determined by parameters of elements forming the synapse load correction circuit 103. The transition period tb required for changing the discrete values is so sufficiently short that the pulse signal Pu1 is not changed in level.

The values of the reference voltages Ref+ and Ref− may not completely match with the discrete values (Vdd, V1, ..., Vb) of the synapse load value during the period ta. The value of the reference voltage Ref+ may be slightly lower than that provided by the reference voltage Ref− preceding by one cycle to the current period Ta. Further, no problem is caused even if the value of the reference voltage Ref− is slightly higher than that of the reference voltage Ref+ in a subsequent cycle to the current period ta. In other words, it is permitted that the potential difference between the current reference voltage Ref− and the reference voltage Ref+ in a subsequent cycle is maintained smaller than the discrete value interval. Even in this case, it is possible to implement a refresh function for remedying the synapse load value.

The refresh control signals Ref+, Ref− and Pu1 are supplied to a plurality of synapse expressing circuits in common. Whatever value the voltage Vc takes in each synapse expressing circuit for providing the synapse load value, therefore, the plurality of synapse expressing circuits execute refresh operations in parallel to correct the associated synapse load values to higher discrete values which are most approximate to the synapse load values before the refresh period is terminated, due to the structure of the invention. Once the refresh operation is carried out, the synapse load values in the respective synapse expressing circuits are completely refreshed to original (or first refreshed) values by subsequent refresh operations. Similar refresh functions are implemented also in procedures for increasing the reference voltages Ref+ and Ref− in the refresh period from the bias voltage Vb successively along the discrete values up to Vdd.

The longest period of the holding period shown in FIG. 4 can be determined by the element structure, or charge retention characteristics and a guarantee period for reliably holding the synapse load value is specifically set. The refresh operation is periodically executed every lapse of such guarantee period. The refresh control signals Ref+, Ref− and Pu1 for executing the refresh operation may be periodically and externally supplied as refresh instruction signals. Alternatively, the refresh control signals Ref+, Ref− and Pu1 may be internally generated in response to an external refresh instruction. Or, the device may contain a timer or the like, for periodically generating the refresh control signals Ref+, Ref− and Pu1 every prescribed interval. When the device contains such a timer, the device may contain a structure indicating execution of the refresh operation internally so that the refresh operation can be monitored from an exterior.

In the structure shown in FIG. 1, two capacitances of the capacitor C2 and the refresh capacitor Cr are coupled to the node N6. During a charge pumping operation, only one of the capacitors executes this operation while one electrode of the other capacitor is fixed to a high potential level, whereby no bad influence is exerted on the charge pumping operation. In this case, however, switching means may be provided to electrically connect only the capacitor Cr to the node N6 in the refresh operation while electrically connecting only the capacitor C2 to the node N6 in a learning operation and a synapse load value setting mode so that only one capacitor is connected to the node N6 in each operation.

Also when the output line Or of the refresh circuit 150 is connected to the node N5, a similar refresh operation is executed. In this case, the voltage Vc of the node N2 is changed in a reversed direction in the holding and refresh periods in the waveform diagram shown in FIG. 4, so that the voltage Vc is lowered when a pulse signal is generated on the output line Or.

Figure 5:
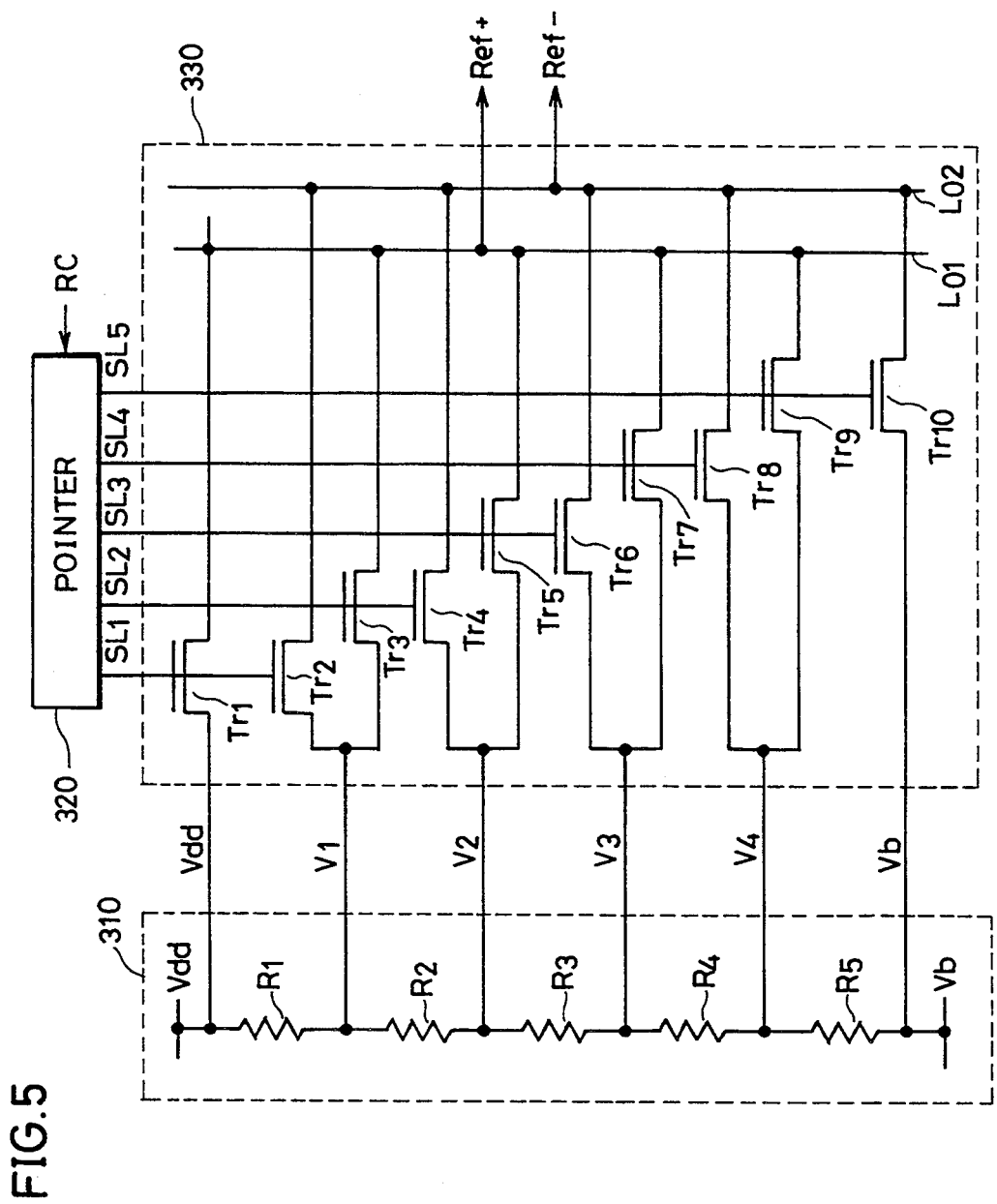
FIG. 5 illustrates an exemplary circuit structure for generating refresh control signals shown in FIG. 1.

A circuit structure for generating the refresh control signals Ref+, Ref− and Pu1 can be implemented by a structure of generating the pulse signal Pu1 only in a refresh operation while changing the reference voltages Ref+ and Ref− every prescribed period. FIG. 5 shows an exemplary circuit structure for generating such refresh control signals.

Referring to FIG. 5, the refresh control generation circuitry includes a resistive voltage dividing circuit 10 for generating the reference voltages Vdd, V1, V2, V3, V4 and Vb, a pointer 320 for selecting refresh reference voltages, and a voltage selection circuit 330 for selecting desired reference voltages from the reference voltages generated by the resistive voltage dividing circuit 310 in response to a selection signal received from the pointer 320.

The resistive voltage dividing circuit 310 includes resistors R1, R2, R3, R4 and R5 which are connected in series between the reference voltage Vdd and the bias voltage Vb. The resistors R1 to R5 generate the reference voltages Vdd to Vb from connection nodes Vdd to Vb thereof, respectively. The nodes and the voltages outputted therefrom are denoted by the same symbols. The resistors R1 to R5 may be formed by resistors of polysilicon or the like, or implemented by resistive connection of MOS transistors. The nodes Vdd to Vb output voltages which are determined by resistance ratios of the resistors R1 to R5.

The pointer 320 successively generates selection signals SL1 to SL5 in response to a pulse signal RC which is generated at a prescribed interval (period ta) in a refresh operation. This pointer 320 can be formed by a shift register which successively shifts its selecting position, for example. The pulse signal RC, being adapted to determine the period ta, is generated at a prescribed interval.

The voltage selection circuit 330 comprises an n-channel MOS transistor Tr1 which transmits the voltage Vdd to an output signal line LO1 in response to the selection signal SL1, an n-channel MOS transistor Tr2 which transmits the voltage V1 to an output signal line LO2 in response to the selection signal SL1, an n-channel MOS transistor Tr3 which transmits the voltage V1 to the output signal line LO1 in response to the selection signal SL2.

The selection circuit 330 further includes an n-channel MOS transistor Tr4 which transmits the voltage V2 to the output signal line LO2 in response to the selection signal SL2, an n-channel MOS transistor Tr5 which transmits the voltage V2 to the output signal line LO1 in response to the selection signal SL3, an n-channel MOS transistor Tr6 which transmits the voltage V3 to the output signal line LO2 in response to the selection signal SL3, an n-channel MOS transistor Tr7 which transmits the voltage V3 to the output signal line LO1 in response to the selection signal SL4, an n-channel MOS transistor Tr8 which transmits the voltage V4 to the output signal line LO2 in response to the selection signal SL4, an n-channel MOS transistor Tr9 which transmits the voltage V4 to the output signal line LO1 in response to the selection signal SL5, and an n-channel MOS transistor Tr10 which transmits the voltage Vb to the output signal line LO2 in response to the selection signal SL5.

The output signal line LO1 generates the reference voltage Ref+, and the output signal line LO2 generates the reference voltage Ref−.

According to the structure shown in FIG. 5, a selected pair of reference voltages are successively generated as the refresh control reference voltages Ref+ and Ref− with the discrete value interval at an interval defined by the pulse signal RC. The pointer 320 selects the selection signal SL1 in operations other than the refresh operation. When the reference voltage Vdd is at an operating source voltage level, a voltage drop is developed in MOS transistor Tr1 by a voltage corresponding to its threshold voltage, and hence it may be necessary to increase the potential level of the selection signal SL1 as compared with the voltage Vdd by the threshold voltage. This structure can be easily implemented through a boosting circuit utilizing a charge pumping.

In the voltage selection circuit 330 shown in FIG. 5, the n-channel MOS transistors may be replaced by CMOS transmission gates, which cause no signal loss in signal transmission. Further, the resistive voltage dividing circuit 310 may be replaced by circuits for generating voltages for respective combinations of discrete values so that such reference voltage generation circuits are successively selected to generate the refresh control voltages Ref+ and Ref−.

Figure 6:
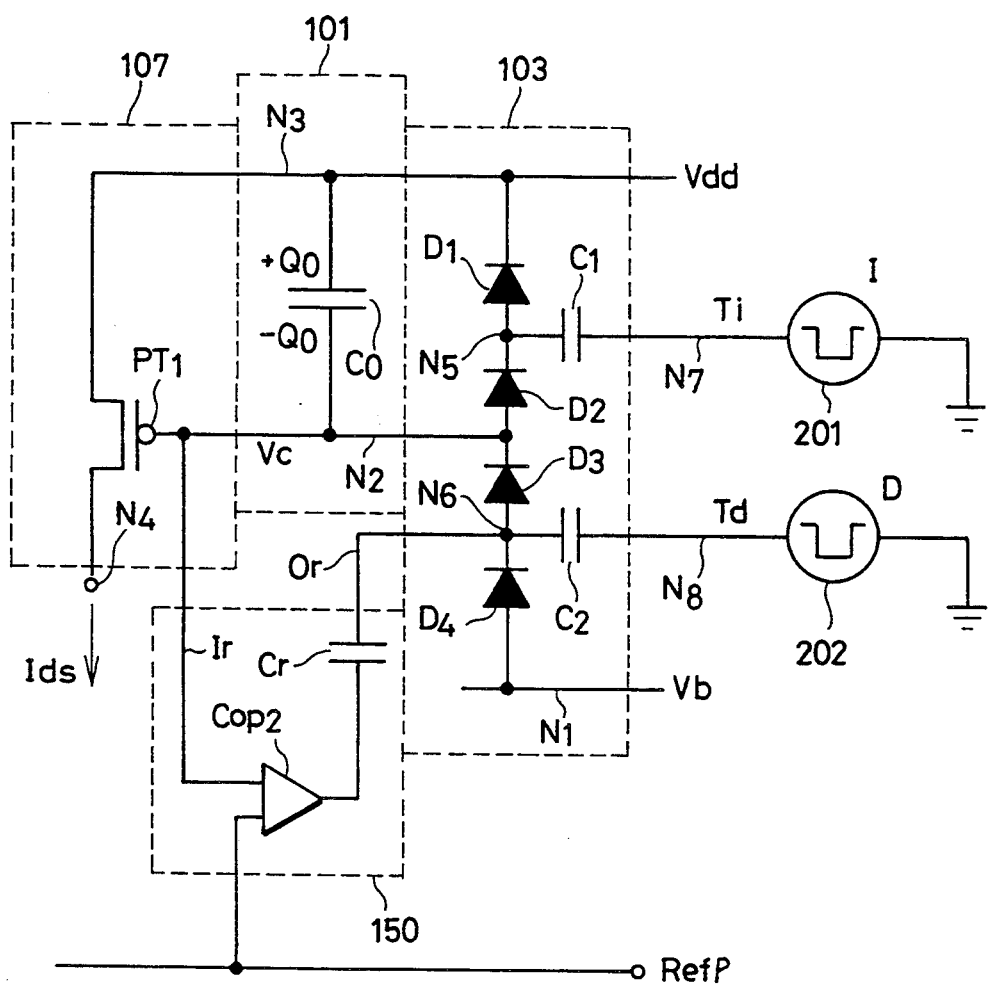
FIG. 6 illustrates the structure of a synapse expressing circuit according to another embodiment of the present invention.

FIG. 6 illustrates the structure of a synapse expressing circuit according to another embodiment of the present invention. Referring to FIG. 6, a refresh control circuit 150 includes a comparator Cop2 which compares a voltage Vc supplied through an input line Ir with a refresh control signal RefP, and a capacitor Cr which executes a charge pumping operation in response to the output of the comparator Cop2.

The comparator Cop2 receives the voltage Vd expressing a synapse load value at its positive input, while receiving the refresh control signal RefP at its negative input. The capacitor Cr has an electrode connected to receive the output of the comparator Cop2, and another electrode connected to a node N6 through an output line Or. Other structures of this circuit are similar to those of the synapse expressing circuit shown in FIG. 1, and corresponding parts are denoted by the same reference numerals. The refresh control signal RefP is supplied to refresh control circuits of a plurality of synapse expressing circuits in common. The operation is now described with reference to a waveform diagram shown in FIG. 7.

Figure 7:
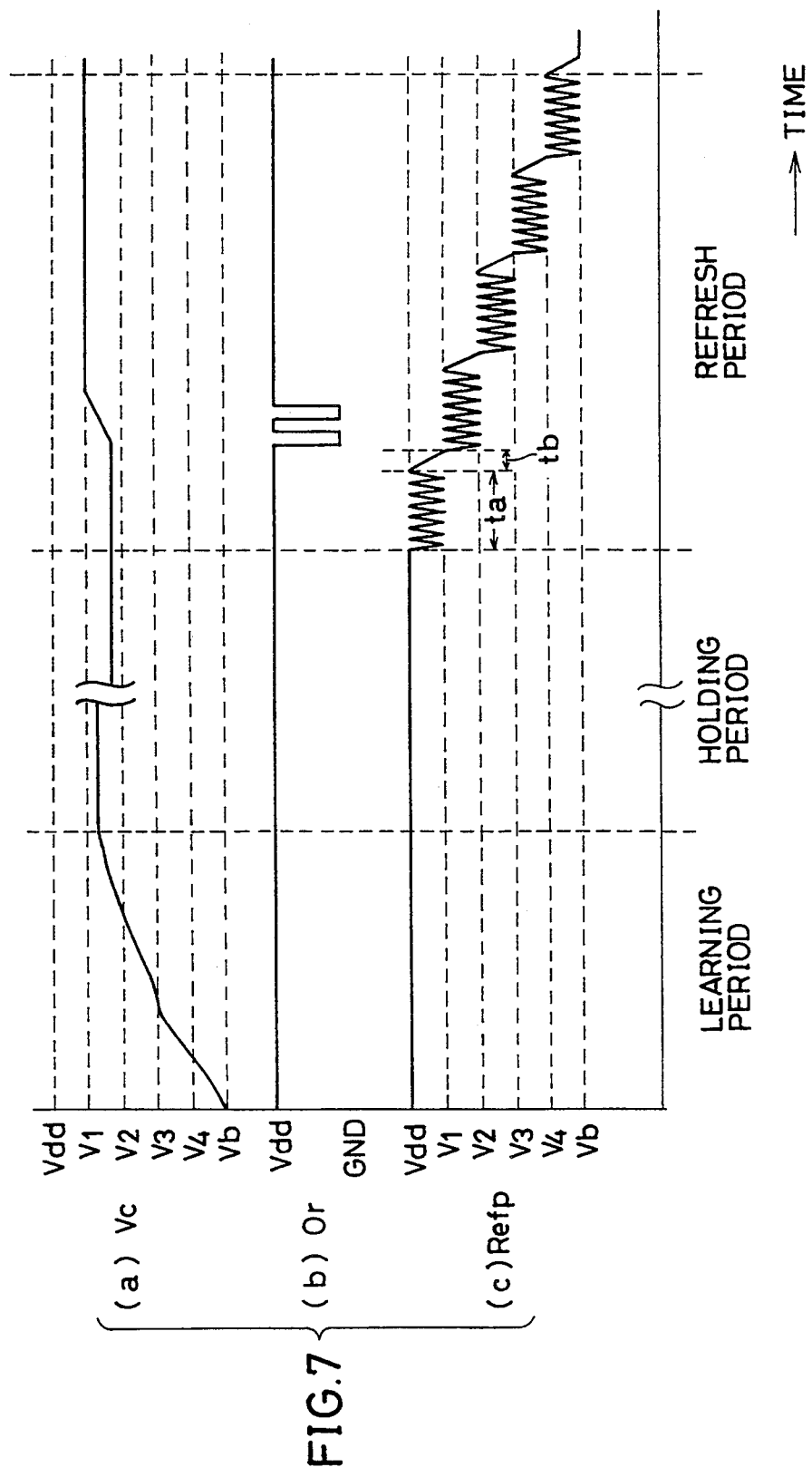
FIG. 7 is a signal waveform diagram showing a refresh operation of the synapse expressing circuit shown in FIG. 6.

Also in the waveform diagram shown in FIG. 7, the synapse load value is refreshed to any one of six discrete values Vdd, V1, V2, V3, V4 and Vb. Consider that the voltage Vc of a node N2 is set between the voltages V1 and V2 in a learning period or in initialization. After a lapse of a prescribed holding period, the refresh control signal RefP is generated. The refresh control signal RefP oscillates for a period ta between upper and lower amplitude limits of the voltages V1 and Vdd. During this period, the output of the comparator Cop2 is at a low level.

In the next cycle, the refresh control signal RefP oscillates for a period to between upper and lower amplitude limits of the voltages V1 and V2. Since the voltage Vc is between the voltages V1 and V2, the output of the comparator Cop2 oscillates in response to the refresh control signal RefP. This oscillation is capacitively coupled to the output line Or through the capacitor Cr, whereby positive charges are injected into the node N6. Thus, the voltage Vc of the node N2 is increased to the voltage V1. In subsequent cycles, the output of the comparator Cop2 is fixed at a high level, so that no charge pumping operation is executed. Thus, the voltage Vc of the node N2 is refreshed to the voltage V1 upon completion of the refresh period, and reliably refreshed to the voltage V1 level in subsequent refresh periods.

In each of the operation waveform diagrams shown in FIGS. 4 and 7, the potential of the output line Or is held at the voltage Vdd level during the learning and holding periods. However, the potential at node N6 is changed in response to the pulse signal Td during the learning period, while the potential of the node N6 is set by the diode D4 at a voltage which is determined by difference between the bias voltage Vb and the threshold voltage of the diode D4 during the holding period. Each of FIGS. 4 and 7 merely illustrates for the purpose of clarification that a pulsing signal appears on the output line Or during the refresh period, causing a charge pumping operation.

Thus, it is possible to reliably perform a refresh operation by generating a pulse signal as the refresh control signal RefP in the refresh period so that upper and lower amplitude limits thereof are successively displaced by the predetermined discrete interval. The refresh control signal RefP may have a saw-tooth-like, rectangular or sinusoidal oscillatory waveform. The duration of the periods ta and tb is similar to that shown in FIG. 1 or 4. The refresh control signal RefP may be successively increased from the bias voltage Vb up to the voltage Vdd.

Figure 8:
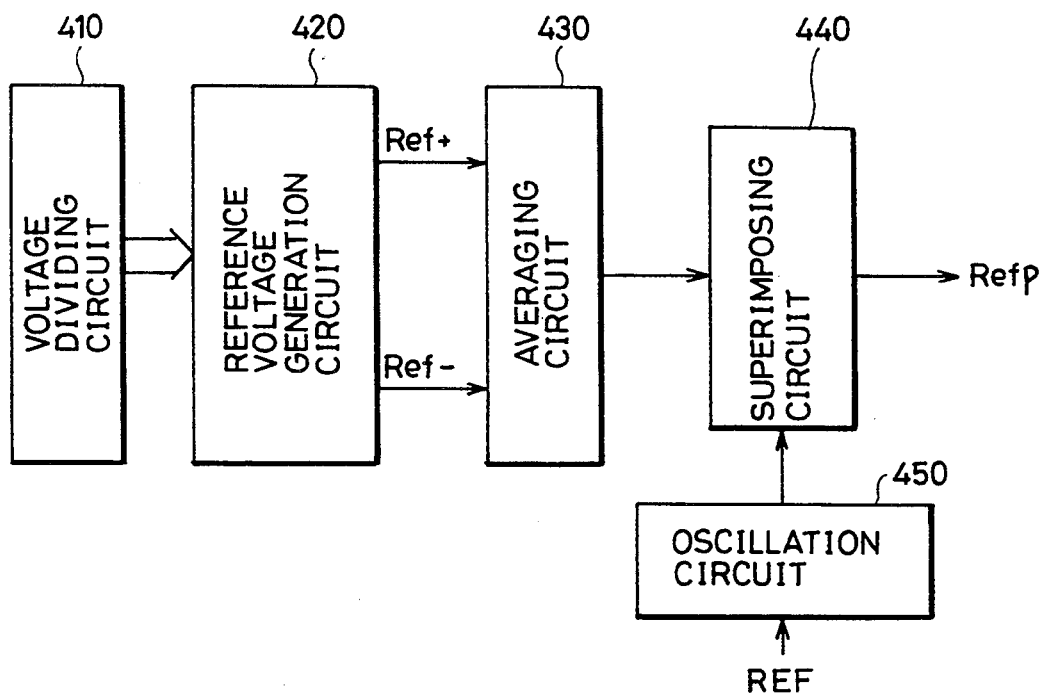
FIG. 8 illustrates an exemplary circuit structure for generating a refresh control signal shown in FIG. 6.

FIG. 8 illustrates an exemplary circuit structure for generating the refresh control signal RefP. Referring to FIG. 8, the refresh control signal generation circuitry includes a voltage dividing circuit 410 which resistively divides the voltage Vdd and the bias voltage Vb to generate respective discrete voltages, a reference voltage generation circuit 420 which generates reference voltages Ref+ and Ref− from the respective discrete voltages received from the voltage dividing circuit 410, an averaging circuit 430 which takes an arithmetical average of the reference voltages Ref+ and Ref− received from the reference voltage generation circuit 420, and a superimposing circuit 440 which superimposes the output ((Ref+)+(Ref−))/2 with a pulse signal outputted from an oscillation circuit 450. The superimposing circuit 440 outputs the refresh control signal RefP. The oscillation circuit 450 outputs an oscillation signal which has an amplitude of the discrete value interval.

The voltage dividing circuit 410 is similar in structure to the resistive voltage dividing circuit 310 shown in FIG. 5, while the reference voltage generation circuit 420 corresponds to the combination of the structure of the pointer 320 and the voltage selection circuit 330 shown in FIG. 5. The averaging value circuit 30 resistively divides the voltages Ref+ and Ref−, for example, to output the arithmetic average value thereof. The oscillation circuit 450 oscillates at a predetermined period in response to a refresh instruction signal REF. The superimposing circuits 440 biases the oscillation signal from the oscillation circuit 450 by the output from the averaging circuit 430, to output the refresh control signal RefP. When no signal REF is received, the output of the superimposing circuit 440 goes to the Vdd level. Thus, it is possible to obtain the refresh control signal RefP having the oscillatory waveform shown in FIG. 7.

In the structure shown in FIG. 8, the oscillation circuit 450 may be replaced by a ring oscillator which has as an operating power source voltage the refresh reference voltage Ref+ and as another power source voltage the refresh reference voltage Ref−, for example, so that it is possible to omit the averaging circuit 430 and the superimposing circuit 440. Also in this case, the ring oscillator or the like oscillates in response to the refresh instruction signal REF.

Figure 9:
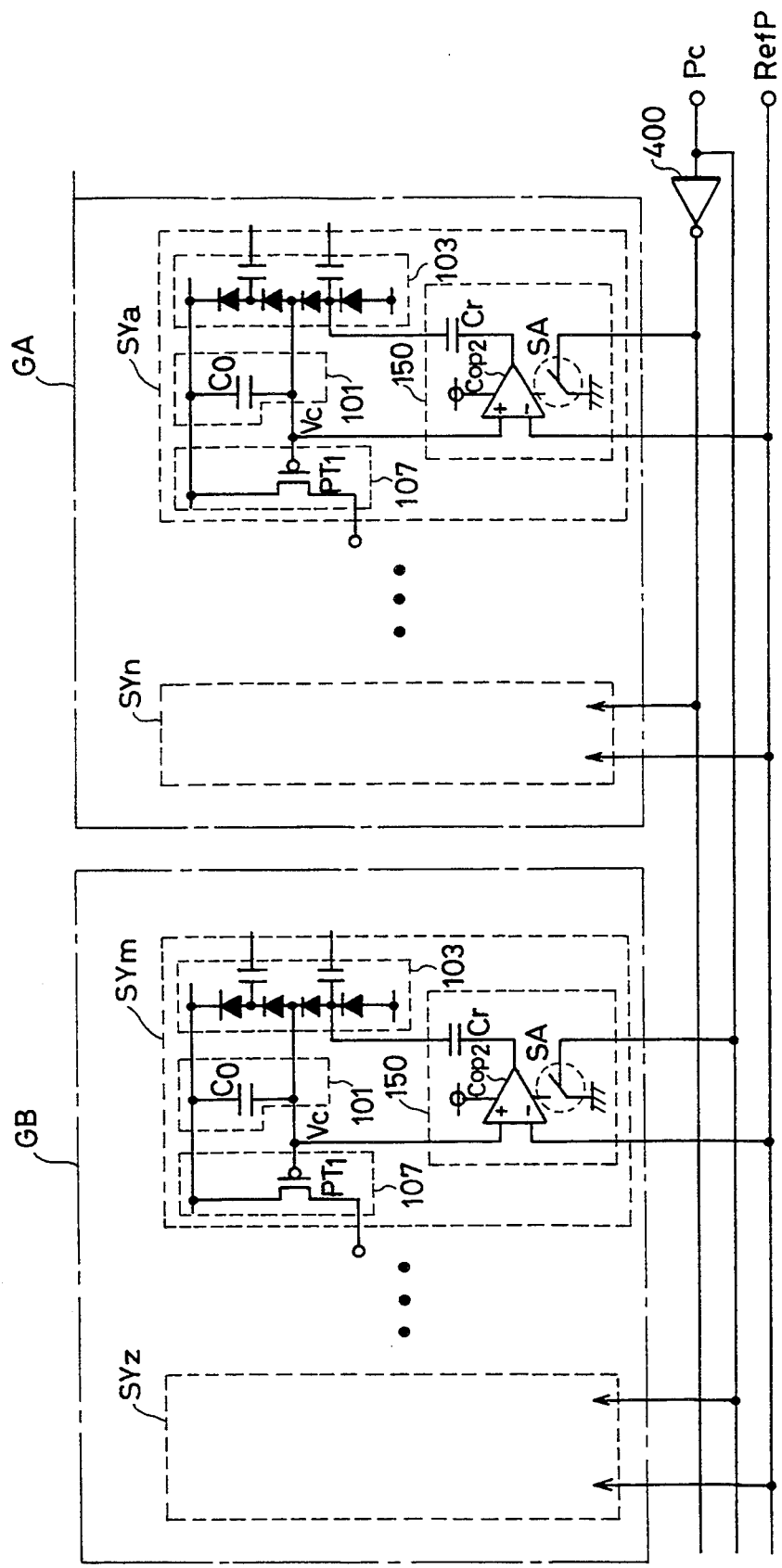
FIG. 9 illustrates the structure of a neural network device including synapse expressing circuits according to still another embodiment of the present invention.
Figure 10:
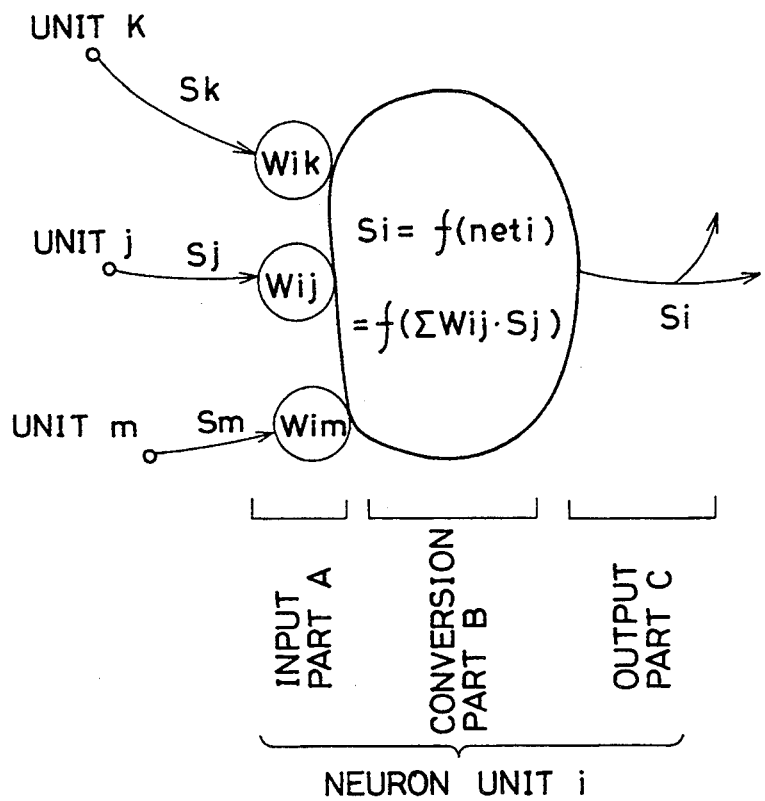
FIG. 10 illustrates the operation principle of a conventional neuron unit employed in a neural network device.
Figure 11:
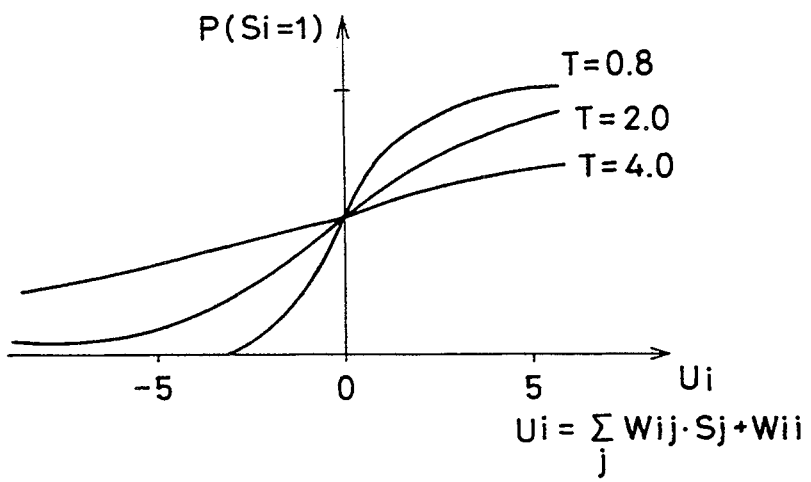
FIG. 11 illustrates exemplary input/output characteristics of the neuron unit shown in FIG. 10.
Figure 12:
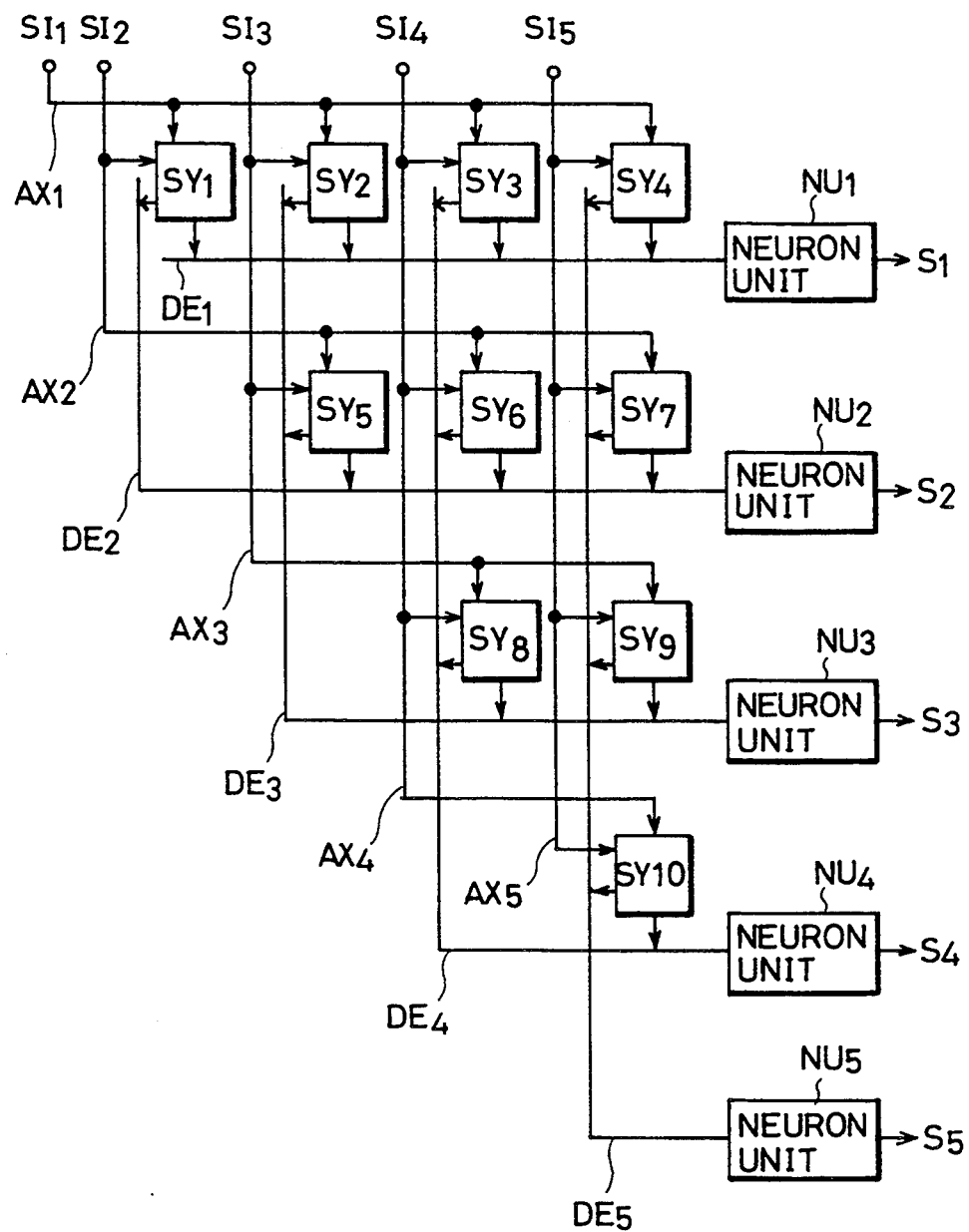
FIG. 12 illustrates an exemplary structure of a semiconductor neural network device.
Figure 13:
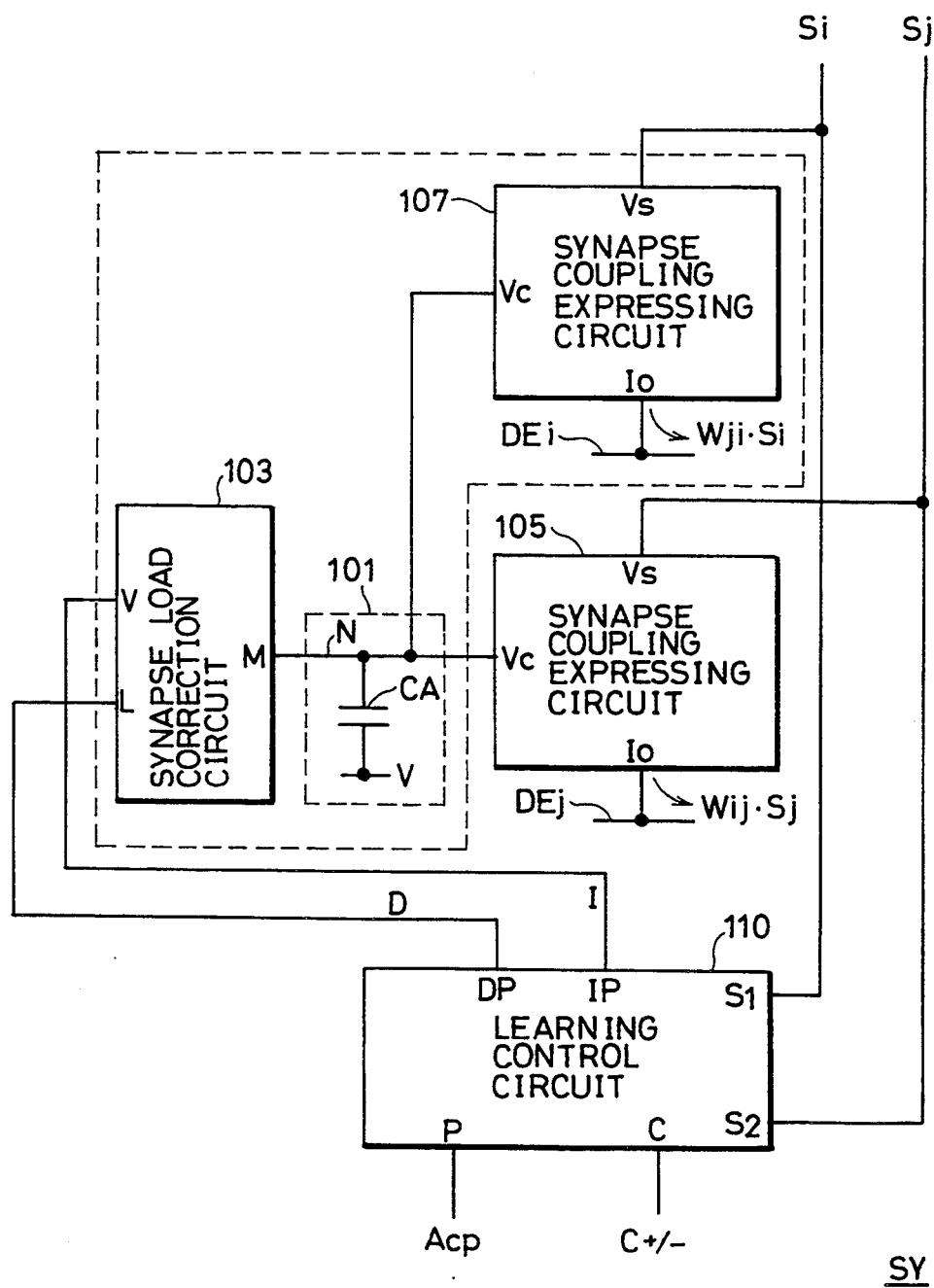
FIG. 13 illustrates an exemplary structure of a synapse expressing circuit shown in FIG. 12.
Figure 14:
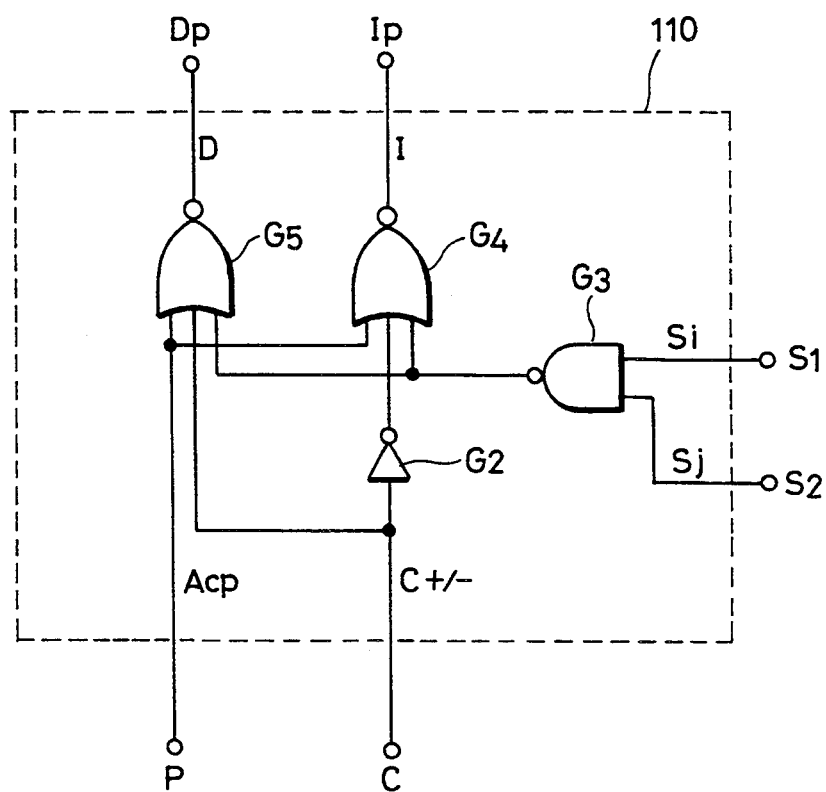
FIG. 14 illustrates an exemplary structure of a learning control circuit shown in FIG. 13.

FIG. 9 illustrates the structure of synapse expressing circuits SY according to still another embodiment of the present invention. Referring to FIG. 9, each synapse expressing circuit SY comprises a refresh control circuit 150 including a comparator Cop2 and a control circuit SA for forcibly stopping the comparing operation of the comparator Cop. The control circuit SA is brought into an operating state to drive the refresh control circuit 150, while the former is brought into a non-operating state to disable the latter. Thus, the synapse expressing circuits SY can be selectively driven for refresh operations, so that it is possible to reduce a consumption current for refresh operations in a neural network device comprising a plurality of such synapse expressing circuits SY. Further, the synapse expressing circuits SY of the same group perform refresh operations at the same timing, whereby it is possible to prevent relative displacement of amounts of stored charges caused by deviation of refresh timing among the synapse expressing circuits due to signal propagation delay or the like.

Referring to FIG. 9, the synapse expressing circuits SY are divided into two groups GA and GB. The group GA includes synapse expressing circuits SYa to SYn, while the group GB includes synapse expressing circuits SYm to SYz. Which synapse expressing circuits are included in which of the groups GA and GB is arbitrarily determined.

An inverter circuit 400 is provided to select one of the groups GA and GB. The inverter circuit 400 receives a group selection signal PC. The output of this inverter circuit 400 is supplied to the control circuits SA of the refresh control circuits 150 which are provided in the synapse expressing circuits SYa to SYn included in the group GA. On the other hand, the group selection signal PC is supplied without inversion to the control circuits SA of the refresh control circuits 150 which are provided in the synapse expressing circuits SYm to SYz included in the group GB. The refresh control signal RefP is supplied to comparison reference inputs of the comparators Cop2 included in the refresh control circuits 150 of the synapse expressing circuits SYa to SYz.

When the group selection signal PC is at a high level, the group GB is selected to perform refresh operations in the synapse expressing circuits SYm to SYz. When the group selection signal PC is at a low level, on the other hand, the group GA is selected to perform refresh operations in the synapse expressing circuits SYa to SYn. The logic of the group selection signal PC may be inverted. Thus, it is possible to greatly reduce consumption power in refresh operations by dividing a plurality of synapse expressing circuits into groups for executing refresh operations in units of the groups.

When each comparator Cop2 has the structure of a source-coupled or emitter-coupled differential type comparator, the control circuit SA included in each refresh control circuit 150 is adapted to allow and inhibit conduction of a constant current path therefor.

When each refresh control circuit 150 has the structure shown in FIG. 1, the NAND gate Na1 may be supplied with a group selection signal which goes low for no selection.

While the refresh control signal RefP is supplied to the groups GA and GB in common, circuits may be provided for each respective group, for generating refresh control signals for the associated groups.

While the synapse expressing circuits SY are divided into two groups GA and GB in the structure shown in FIG. 9, the number of the groups is not restricted to two but may be arbitrarily selected. If the number of the groups is three or more, a decoder receiving a multi bit group designating signal is provided for selecting a group through decoding operation. Further, each group may include an arbitrary number of synapse expressing circuits.

In each of the aforementioned embodiments, the transistors included in the synapse coupling expressing circuits of the synapse expressing circuit are formed by p-channel MOS transistors. Such p-channel MOS transistors may be replaced by n-channel MOS transistors.

While the capacitor CO included in the synapse load value storage circuit 101 is connected between the reference voltage Vdd serving as a source voltage and the node N2, for example, the capacitor CO may alternatively be connected between the node N2 and the bias voltage Vb.

According to the present invention, as hereinabove described, the amount of charges stored in the capacitive element for storing a synapse load value is refreshed in the synapse expressing circuit, whereby it is possible to obtain a synapse expressing circuit which stably holds a synapse load value for a long time. Further, the amount of charges stored in the capacitive element is adjusted through a charge pumping operation, whereby it is possible to refresh the synapse load value in multiple levels.

In addition, the refresh control signals are supplied to refresh control circuits of a plurality of synapse expressing circuits, whereby it is possible to execute refresh operations in the plurality of synapse expressing circuits in parallel, thereby greatly reducing the time required for the refresh operations.

In the neural network device including a plurality of synapse expressing circuits, the synapse load value stored in an analog form in each synapse expressing circuit is remedied in response to a refresh instruction. Thus, it is possible to implement a highly reliable neural network device, which stably operates for a long time.

Further, the synapse expressing circuits are divided into groups to execute refresh operations in units of the groups, whereby it is possible to greatly reduce consumption power required for the refresh operations. In addition, the plurality of synapse expressing circuits are refreshed in parallel so that the synapse load values can be refreshed without relative deviation of the amounts of stored charges which may tend to take place by displacement of refresh timing when such synapse expressing circuits are serially or sequentially refreshed, whereby the synapse load values in the respective synapse expressing circuits can be reliably refreshed to original values.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A synapse expressing unit for electronically expressing a synapse for coupling neurons through a predetermined coupling strength in a neural network, comprising:

synapse load storage means for storing synapse load value information representative of the coupling strength, said synapse load storage means including capacitance means for storing the synapse load value information in a form of electronic charges, and said capacitance means including a first electrode for providing the synapse load value; and refreshing means responsive to a refresh instruction, for refreshing the synapse load value information in said synapse load storage means, said refreshing means including comparison means for comparing a potential at said first electrode of said capacitance means and a first reference potential, and adjusting means responsive to said comparison means for recovering the electric charges in said capacitance means at said first electrode through a charge pumping operation.

2. A synapse expressing unit according to claim 1, wherein said comparison means includes a comparator responsive to the potential at said first electrode, the first reference potential and a second reference potential for determining whether the potential at said first electrode lies between the first and second reference potentials, and drive means responsive to said comparator for enabling the charge pumping operation of said adjusting means, when said comparator indicates that the potential at said first electrode lies between the first and second reference potentials.

3. A synapse expressing unit according to claim 2, wherein said drive means comprises means responsive to said comparator for passing a pulsing signal to said adjusting means.

4. A synapse expressing unit for electronically expressing a synapse for coupling neurons through a predetermined coupling strength in a neural network, comprising:

synapse load storage means for storing synapse load value information representative of the coupling strength, said synapse load storage means including capacitance means for storing the synapse load value information in a form of electronic charges, and said capacitance means including a first electrode for providing the synapse load value; and refreshing means responsive to a refresh instruction, for refreshing the synapse load value information in said synapse load storage means, said refreshing means including comparison means for comparing a potential at said first electrode with a reference signal oscillating between a first level and a second level, and adjusting means responsive to said comparison means, for remedying a change in the amount of the electric charges in said synapse load storage means through a charge pump operation.

5. A synapse expressing unit according to claim 1 wherein said adjusting means includes a capacitor responsive to the comparison means.

6. A synapse expressing unit according to claim 1, further comprising an inhibition means responsive to a refresh inhibition signal for inhibiting an operation of said refreshing means.

7. A synapse expressing unit according to claim 1, further comprising:

inhibition means responsive to a refresh inhibition signal for disabling the comparison means.

8. A synapse expressing unit according to claim 4, wherein said adjusting means includes a capacitor responsive To the comparison means.

9. A synapse expressing unit according to claim 4, further comprising:

inhibition means responsive to a refresh inhibition signal for disabling the comparison means.

10. A semiconductor neural network circuit device comprising:

control means for generating a refresh control signal; and a plurality of synapse expressing units each expressing a synapse for coupling associated neurons through a predetermined coupling strength;

each said synapse expressing unit including synapse load storage means for storing a synapse load value information representative of the predetermined coupling strength in an analog fashion, and (b) refreshing means responsive to said refresh control signal, for refreshing the synapse load value information stored in said synapse load storage means, wherein said synapse load storage means includes a capacitance element for storing the synapse load value information in a form of electric charges and having a first electrode for providing the synapse load value, and said refreshing means includes comparison means responsive to said refresh control signal for comparing a potential at said first electrode with a reference potential signal, and adjusting means responsive to said comparison means for compensating for the change of the amount of electric charges stored in said capacitance element through a charge pump operation, said reference potential signal is included in said refresh control signal.

11. A semiconductor neural network circuit device according to claim 10, wherein said control means includes generation means for generating a plurality of reference potentials at different discrete values and selection means for sequentially selecting a set of two reference potentials out of said plurality of reference potentials for supply to said comparison means as said reference potential signal, a selected set of two reference potentials having a predetermined potential difference.

12. A semiconductor neural network circuit device according to claim 11, wherein said comparison means includes
    detection means responsive to the potential at said first electrode and said reference potential signal for detecting when the potential at said first electrode lies between the two reference potentials of the selected set, and
    drive means responsive to said detection means for enabling the adjusting means.

13. A semiconductor neural network circuit device according to claim 12, wherein said control means further includes pulse means for supplying a pulse signal, and wherein
    said drive means includes means responsive to said detection means for passing said pulse signal to said adjusting means to enable the charge pump operation.

14. A semiconductor neural network circuit device according to claim 10, wherein said control means includes generation means for sequentially generating an oscillating signal with a predetermined amplitude at different discrete potential levels as said refresh control signal, said amplitude substantially equal to a difference between adjacent discrete potential levels.

* * * * *

UNITED STATES PATENT AND TRADEMARK OFFICE
CERTIFICATE OF CORRECTION

PATENT NO. : 5,386,149
DATED : January 31, 1995
INVENTOR(S) : Yutaka ARIMA

It is certified that error appears in the above-indentified patent and that said Letters Patent is hereby corrected as shown below:

On the title page, item [54] should read as follows:

--[54] SYNAPSE EXPRESSING UNIT CAPABLE OF REFRESHING STORED SYNAPSE LOAD DATA--

Signed and Sealed this

Sixth Day of June, 1995

*Attest:*

BRUCE LEHMAN

*Attesting Officer*     *Commissioner of Patents and Trademarks*